US012068550B2

(12) United States Patent
Lee et al.

(10) Patent No.: US 12,068,550 B2
(45) Date of Patent: Aug. 20, 2024

(54) DIELECTRIC RESONATOR ANTENNA AND ANTENNA MODULE

(71) Applicant: SAMSUNG ELECTRO-MECHANICS CO., LTD., Suwon-si (KR)

(72) Inventors: Woncheol Lee, Suwon-si (KR); Wongi Kim, Suwon-si (KR); Jeongki Ryoo, Suwon-si (KR); Hyungjin Lee, Suwon-si (KR); Daeki Lim, Suwon-si (KR); Juhyoung Park, Suwon-si (KR); Sungyong An, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 66 days.

(21) Appl. No.: 17/411,237

(22) Filed: Aug. 25, 2021

(65) Prior Publication Data

US 2022/0336957 A1 Oct. 20, 2022

(30) Foreign Application Priority Data

Apr. 15, 2021 (KR) ........................ 10-2021-0049234

(51) Int. Cl.
*H01Q 9/04* (2006.01)
*H01Q 1/48* (2006.01)

(52) U.S. Cl.
CPC ........... *H01Q 9/0485* (2013.01); *H01Q 9/045* (2013.01); *H01Q 1/48* (2013.01)

(58) Field of Classification Search
CPC .... H01Q 9/0485; H01Q 9/045; H01Q 9/0407; H01Q 1/48; H01Q 1/243; H01Q 1/46; H01Q 21/08
See application file for complete search history.

(56) References Cited

U.S. PATENT DOCUMENTS 5,453,754 A * 9/1995 Fray ..................... H01Q 9/0485 343/873
8,749,434 B2 6/2014 Han et al.
2018/0159203 A1* 6/2018 Baks ........................ H01Q 1/48
(Continued)

FOREIGN PATENT DOCUMENTS

JP 2005-142864 A 6/2005
KR 2002-0083044 A 11/2002

OTHER PUBLICATIONS

Richtmyer, R.D. "Dielectric Resonators", *Journal of Applied Physics,* vol. 10, Jun. 1939, (pp. 391-398).
(Continued)

*Primary Examiner* — Awat M Salih
(74) *Attorney, Agent, or Firm* — NSIP Law

(57) ABSTRACT

A dielectric resonator antenna includes a first dielectric material block, a second dielectric material block stacked in a first direction on the first dielectric material block, a bonding layer disposed between the first dielectric material block and the second dielectric material block, and combined to the first dielectric material block and the second dielectric material block, a feeder disposed on the first dielectric material block, a feed pattern disposed between the first dielectric material block and the second dielectric material block and connected to the feeder, and an antenna patch disposed between the first dielectric material block and the second dielectric material block and spaced from the feed pattern.

24 Claims, 44 Drawing Sheets

(56) References Cited

U.S. PATENT DOCUMENTS

| | | | | |
|---|---|---|---|---|
| 2019/0089047 | A1* | 3/2019 | Hara | H01Q 21/22 |
| 2019/0221926 | A1 | 7/2019 | Pance et al. | |
| 2021/0384648 | A1* | 12/2021 | Leung | H01Q 9/0485 |

OTHER PUBLICATIONS

Luk, Kwai-Man et al., "Dielectric Resonator Antennas", *Research Studies Press Ltd.,* 16 Coach House Cloisters, 10 Hitchin Street, Baldock, Hertfordshire, SG7 6AE, England, www.research-studies-press.co.uk, Copyright 2003 (404 pages in English).

* cited by examiner

DIELECTRIC RESONATOR ANTENNA AND ANTENNA MODULE

CROSS-REFERENCE TO RELATED APPLICATIONS

This application claims the benefit under 35 USC 119(a) of Korean Patent Application No. 10-2021-0049234 filed in the Korean Intellectual Property Office on Apr. 15, 2021, the entire disclosure of which is incorporated herein by reference for all purposes.

BACKGROUND

1. Field

The present disclosure relates to a dielectric resonator antenna and an antenna module.

2. Description of the Background

Developments in wireless communication systems have substantially changed lifestyles for the last twenty years. To support latent wireless application programs such as multimedia devices, Internet of things, and intelligent transport systems, high-quality mobile systems with gigabit data rates per second are required. This may be impossible to be realized because of the limited bandwidth in the current 4th-generation communication system (4G). The International Telecommunication Union (ITU) allowed the mmWave spectrum for the 5th-generation (5G) application range so as to overcome the bandwidth limit issue. After this, both the academic circles and the industrial world are paying much attention to studies on the mmWave antenna.

Recently, sizes of the mobile mmWave 5G antenna modules are required to be down-sized. When considering a propagation characteristic, the 5G antenna is positioned on the outermost side of the mobile phone, so a length of one side of the antenna module is gradually reduced in the mobile phone structure in the trend of larger screens and slimmer profiles.

Therefore, as the antenna module becomes smaller, performance such as antenna gains and bandwidths may be deteriorated.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a dielectric resonator antenna includes a first dielectric material block, a second dielectric material block stacked in a first direction on the first dielectric material block, a bonding layer disposed between the first dielectric material block and the second dielectric material block, and combined to the first dielectric material block and the second dielectric material block, a feeder disposed on the first dielectric material block, a feed pattern disposed between the first dielectric material block and the second dielectric material block and connected to the feeder, and an antenna patch disposed between the first dielectric material block and the second dielectric material block and spaced from the feed pattern.

The feed pattern and the antenna patch may be disposed between the first dielectric material block and the bonding layer.

The feed pattern and the antenna patch may be disposed on a same layer.

The feed pattern may be disposed between the first dielectric material block and the bonding layer, and the antenna patch may be disposed between the bonding layer and the second dielectric material block.

The feed pattern may include a portion not overlapping the antenna patch in the first direction.

The feeder may be a feed strip disposed outside the first dielectric material block.

The first dielectric material block may include a plurality of dielectric layers.

The feeder may include a first feeder and a second feeder spaced from each other, the feed pattern may include a first feed pattern connected to the first feeder and a second feed pattern connected to the second feeder, and the antenna patch may be spaced from at least one of the first feed pattern and the second feed pattern.

An electronic device may include the dielectric resonator antenna and one or more of a communication module and a baseband circuit, wherein the dielectric resonator antenna device may be disposed near a side of the electronic device, and may be connected to at least one of the one or more of a communication module and a baseband circuit.

In another general aspect, a dielectric resonator antenna module includes a substrate, a feed wire disposed on the substrate and a ground electrode disposed on the substrate and insulated from the feed wire, a first dielectric material block disposed on the substrate and connected to the ground electrode, a second dielectric material block stacked on the first dielectric material block in a first direction, a bonding layer disposed between the first dielectric material block and the second dielectric material block and combined to the first dielectric material block and the second dielectric material block, a feeder disposed on the first dielectric material block and connected to the feed wire, a feed pattern disposed between the first dielectric material block and the second dielectric material block and connected to the feeder, and an antenna patch disposed between the first dielectric material block and the second dielectric material block and spaced from the feed pattern.

The dielectric resonator antenna module may further include a first contact pad disposed between the feed wire and the feeder, and a plurality of second contact pads disposed between the first dielectric material block and the ground electrode.

A thickness of the first contact pad and a thickness of the second contact pads may be substantially the same as each other, and the first contact pad and the second contact pads may be disposed at regular intervals along an edge of the first dielectric material block.

The first dielectric material block may include a plurality of first dielectric material layers of the substrate.

The second dielectric material block may include a plurality of second dielectric material layers of the substrate.

An electronic device may include the dielectric resonator antenna module, and one or more of a communication module and a baseband circuit, wherein the dielectric resonator antenna module is disposed near a side of the electronic device, and is connected to at least one of the one or more of a communication module and a baseband circuit.

In another general aspect, a dielectric resonator antenna includes a first dielectric material block, a feed pattern and an antenna patch disposed spaced apart from each other on the first dielectric material block, a second dielectric material block disposed on the feed pattern and the antenna patch, and a feeder traversing the first dielectric material block and connected to the feed pattern.

The dielectric resonator antenna may further include a bonding layer disposed between the first dielectric material block and the second dielectric material block, and combined to the first dielectric material block and the second dielectric material block.

The antenna patch may be disposed between the first dielectric block and the bonding layer or between the bonding layer and the second dielectric material block, and the feed pattern may be disposed between the first dielectric block and the bonding layer.

The feed pattern may be exposed to the second dielectric material block by the antenna patch.

The feeder may include one or more of a feed strip disposed outside the first dielectric material block and a feed via disposed in the first dielectric material block.

An electronic device may include the dielectric resonator antenna.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
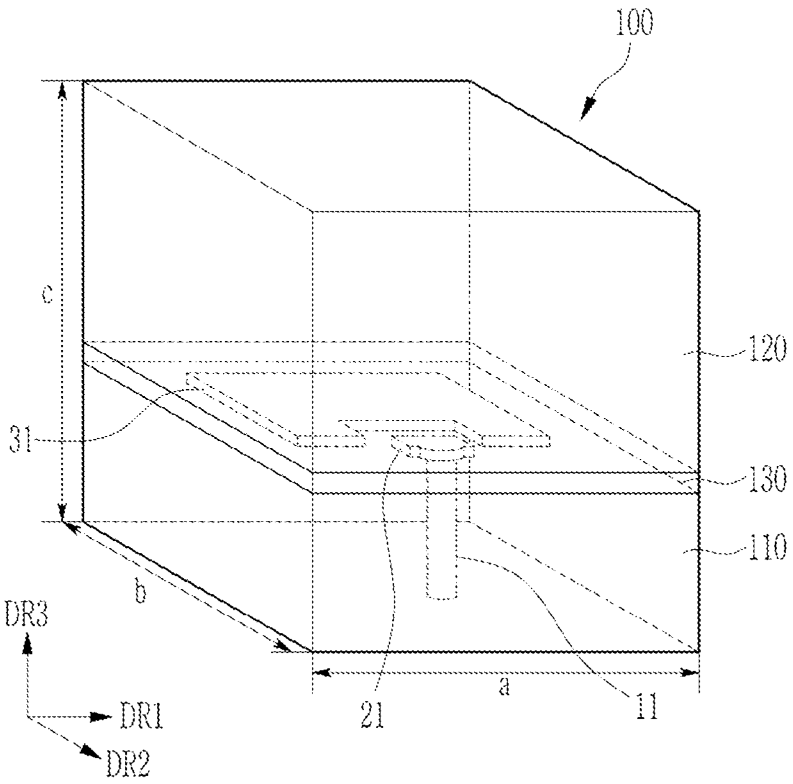
FIG. 1 shows a perspective view of a dielectric resonator antenna according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The phrase "on a plane" means viewing the object portion from the top, and the phrase "on a cross-section" means viewing a cross-section of which the object portion is vertically cut from the side.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of this disclosure. Further, although the examples described herein have a variety of configurations, other configurations are possible as will be apparent after gaining an understanding of this disclosure.

Patterns, vias, planes, lines, and electrical connection structures may include metal materials (e.g., conductive materials such as copper (Cu), aluminum (Al), silver (Ag), tin (Sn), gold (Au), nickel (Ni), lead (Pb), titanium (Ti), or their alloys), and they may be formed according to plating methods such as chemical vapor deposition (CVD), physical vapor deposition (PVD), sputtering, subtractive, additive, semi-additive process (SAP), or modified semi-additive process (MSAP), and they are not limited thereto.

A dielectric layer and/or an insulation layer may be realized with thermosetting resin such as FR4, liquid crystal polymer (LCP), low temperature co-fired ceramic (LTCC), or epoxy resin, thermoplastic resin such as a polyimide, resin generated by impregnating the above-noted resin together with an inorganic filler into a core material such as glass fiber (or glass cloth or glass fabric), prepreg, Ajinomoto Build-up Film (ABF), FR-4, Bismaleimide Triazine (BT), photo imagable dielectric (PID) resin, copper clad laminate (CCL), glass, or ceramic-based insulator.

The radio frequency (RF) signal may have a format according to other random wireless and wired protocols designated by Wi-Fi (IEEE 802.11 family, etc.), WiMAX (IEEE 802.16 family, etc.), IEEE 802.20, LTE (long term evolution), Ev-DO, HSPA+, HSDPA+, HSUPA+, EDGE, GSM, GPS, GPRS, CDMA, TDMA, DECT, Bluetooth, 3G, 4G, 5G, and subsequent ones.

The described technology has been made in an effort to provide an antenna for improving a gain and bandwidth, and an antenna module.

However, tasks to be solved by embodiments may not be limited to the above-described tasks, and may be extended in various ways within a range of technical scopes included in the embodiments.

Various embodiments will now be described with reference to accompanying drawings.

An antenna 100 according to an embodiment will now be described with reference to FIG. 1 to FIG. 3. FIG. 1 shows a perspective view of a dielectric resonator antenna according to an embodiment, FIG. 2 shows a top plan view of a dielectric resonator antenna according to an embodiment, and FIG. 3 shows a cross-sectional view with respect to a line III-III' of FIG. 2.

Figure 2:
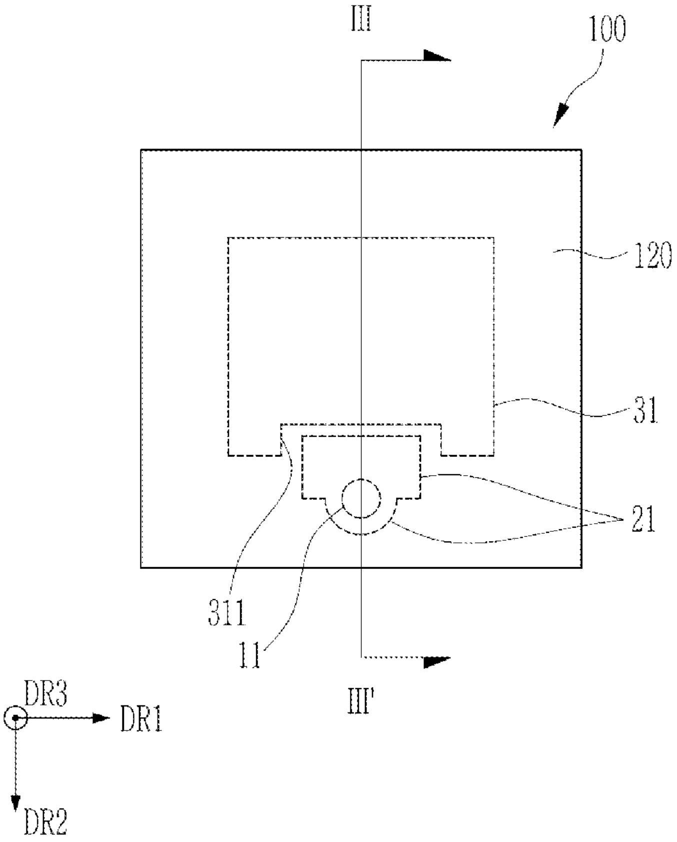
FIG. 2 shows a top plan view of a dielectric resonator antenna according to an embodiment.
Figure 3:
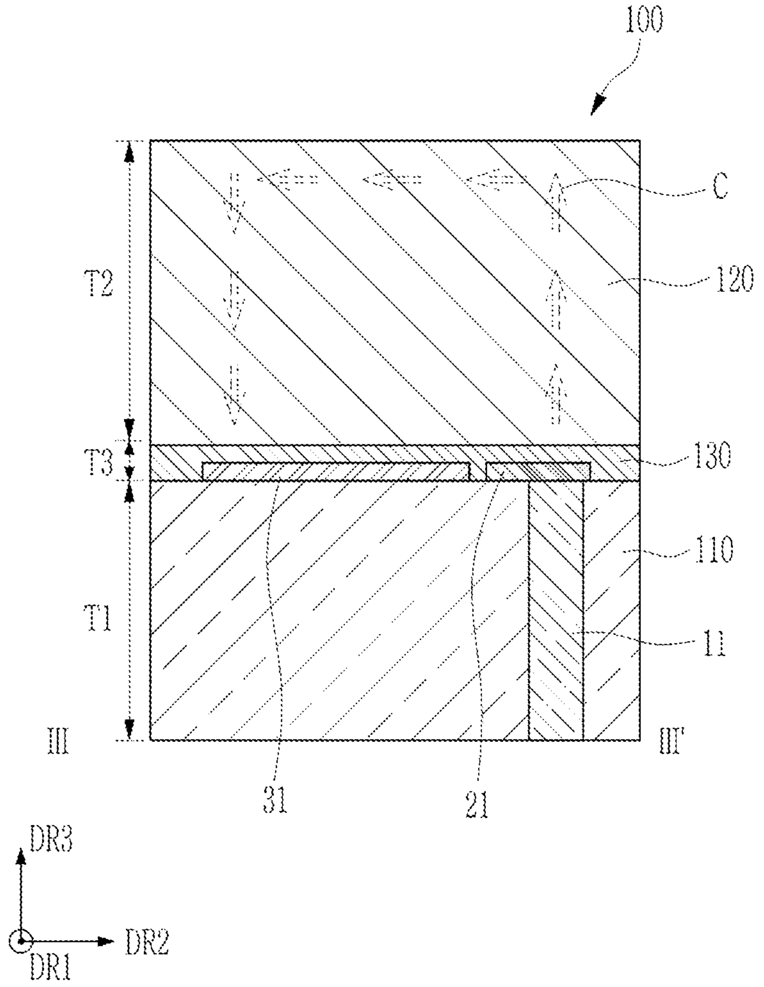
FIG. 3 shows a cross-sectional view with respect to a line III-III' of FIG. 2.

Referring to FIG. 1 to FIG. 3, the dielectric resonator antenna (DRA) 100 includes a first dielectric material block 110 and a second dielectric material block 120 stacked in a third direction DR3, a bonding layer 130 positioned between the first dielectric material block 110 and the second dielectric material block 120, a first feed via 11 inserted into the first dielectric material block 110, and a first feed pattern 21 and an antenna patch 31 positioned between the first dielectric material block 110 and the second dielectric material block 120.

The first dielectric material block 110 and the second dielectric material block 120 may have a shape extending in a first direction DR1 and a second direction DR2 that are different from each other and the third direction DR3 that is perpendicular to the first direction DR1 and the second direction DR2, and the first dielectric material block 110 and the second dielectric material block 120 are stacked in the third direction DR3 with the bonding layer 130 therebetween.

The first dielectric material block 110 may, for example, have a rectangular parallelepiped shape, and the first dielectric material block 110 may have a via hole into which a first feed via 11 is inserted. The first feed via 11 may penetrate to an upper side of the first dielectric material block 110 from a lower side thereof in the third direction DR3. However, the first feed via 11 may be positioned in a portion of the first dielectric material block 110 in the third direction DR3.

The second dielectric material block 120 may, for example, have a rectangular parallelepiped shape.

The first dielectric material block 110 and the second dielectric material block 120 may have a same planar shape so that they may overlap each other in the third direction DR3. Therefore, when the first dielectric material block 110 and the second dielectric material block 120 are stacked in the third direction DR3 and are bonded to each other through the bonding layer 130, the respective sides, that is, four pairs of sides, may be smoothly connected to each other without steps so that they may be positioned in a coplanar way. However, a surface of the bonding layer 130 formed in a plan view where the first direction DR1 and the second direction DR2 cross each other may be smaller than a surface of the first dielectric material block 110 and the second dielectric material block 120.

A plurality of via holes are bored in the first dielectric layer configuring the first dielectric material block 110 to form a plurality of first feed vias 11, a plurality of first feed patterns 21 and a plurality of antenna patches 31 are formed on the first dielectric layer, a second dielectric layer configuring the second dielectric material block 120 is disposed on the first dielectric layer, a polymer layer configuring the bonding layer is disposed between the first dielectric layer and the second dielectric layer and is then cured to bond the first dielectric layer and the second dielectric layer, and the first dielectric layer and the second dielectric layer bonded to each other are cut for respective antenna units to totally manufacture a plurality of dielectric resonator antennas 100. As the dielectric resonator antennas 100 are totally manufactured as described above, the dielectric resonator antenna 100 may be disposed to be smoothly connected to each other without steps so that the first dielectric material block 110 and the second dielectric material block 120 may be stacked in the third direction DR3, and the respective sides, that is, the four pairs of sides, may be positioned on the same plane.

A thickness of the first dielectric material block 110 and a thickness of the second dielectric material block 120 measured in the third direction DR3 may be different from each other. For example, a second thickness T2 of the second dielectric material block 120 may be greater than a first thickness T1 of the first dielectric material block 110.

The bonding layer 130 may have adherence to bond the first dielectric material block 110 and the second dielectric material block 120. The bonding layer 130 may include a curable material, and it may be cured between the first dielectric material block 110 and the second dielectric material block 120 so the first dielectric material block 110 and the second dielectric material block 120 may be bonded to each other through the bonding layer 130.

A third thickness T3 of the bonding layer 130 measured in the third direction DR3 may be less than the first thickness T1 of the first dielectric material block 110 and the second thickness T2 of the second dielectric material block 120 measured in the third direction DR3.

The first feed pattern 21 and the antenna patch 31 may be positioned between the first dielectric material block 110 and the bonding layer 130, and the first feed pattern 21 and the antenna patch 31 may be disposed to be spaced from each other on a plane generated where the first direction DR1 crosses the second direction DR2.

In detail, the first feed pattern 21 and the antenna patch 31 may be positioned on the first dielectric material block 110 in the third direction DR3, and the bonding layer 130 may be positioned on the first feed pattern 21 and the antenna patch 31.

The first feed pattern 21 may, for example, have a rectangular shape or a square planar shape, and may have a smaller surface than the first dielectric material block 110.

The first feed pattern 21 may be fed from the first feed via 11. That is, the first feed via 11 may be a feeder of the antenna 100. In the shown embodiment, the first feed pattern 21 may be positioned on the first feed via 11 in the third direction DR3 to contact the first feed via 11.

The antenna patch 31 is spaced from the first feed pattern 21 fed by the first feed via 11 and is coupled to the same, so it may be fed by a capacitive coupled feeding method.

Not the metal layer but the bonding layer 130 may be positioned between the second dielectric material block 120 and the first feed pattern 21. That is, the antenna patch 31 may not be positioned between the first feed pattern 21 and the second dielectric material block 120.

Sizes and shapes of the first feed pattern 21 and the antenna patch 31 are modifiable, and a degree of freedom of designing the antenna may be improved by changing the sizes and the shapes of the first feed pattern 21 and the antenna patch 31, and a gap between the first feed pattern 21 and the antenna patch 31.

The first dielectric material block 110 and the second dielectric material block 120 may include a ceramic material, and the bonding layer 130 may include a polymer. In detail, the bonding layer 130 may include at least one or more combinations of polyimide (PI), poly(methyl methacrylate) (PMMA), polytetrafluoroethylene (PTFE), polyphenylene ether (PPE), benzocyclobutene (BCB), and liquid crystal polymer (LCP) based polymers.

A relative dielectric constant of the first dielectric material block 110 may be the same as or different from a relative dielectric constant of the second dielectric material block 120. In detail, the relative dielectric constant of the second dielectric material block 120 may be greater than the relative dielectric constant of the first dielectric material block 110.

The relative dielectric constant of the bonding layer 130 may be less than the relative dielectric constant of the first dielectric material block 110 and the relative dielectric constant of the second dielectric material block 120.

The antenna 100 may have a rectangular parallelepiped shape including a first length (a) in the first direction DR1, a second length (b) in the second direction DR2, and a third length (c) in the third direction DR3.

When an electric signal is applied to the first feed via 11, resonance with a predetermined frequency is generated in the first dielectric material block 110, the second dielectric material block 120, and the bonding layer 130, and RF signals may be transmitted and received according to a resonance frequency of the antenna 100.

The RF signal may have a form of Wi-Fi (IEEE 802.11 family and others), WiMAX (IEEE 802.16 family and others), IEEE 802.20, LTE (long term evolution), Ev-DO, HSPA+, HSDPA+, HSUPA+, EDGE, GSM, GPS, GPRS, CDMA, TDMA, DECT, Bluetooth, 3G, 4G, 5G, and other arbitrary wired and wireless protocols, and it is not limited thereto.

The resonance frequency inside the first dielectric material block 110, the second dielectric material block 120, and the bonding layer 130 may be determined from the relative dielectric constants of the first dielectric material block 110, the second dielectric material block 120, and the bonding layer 130, the value of the first length (a) of the antenna 100 in the first direction DR1, the value of the second length (b) in the second direction DR2, the value of the third length (c) in the third direction DR3, and propagation constants in an axis direction in parallel to the first direction DR1 to the third direction DR3.

When the resonance frequency of the antenna 100 is constant, the size of the antenna 100 is proportional to $(e)^{-1/2}$ when the relative dielectric constants of the first dielectric material block 110, the second dielectric material block 120, and the bonding layer 130 are set to be e. Therefore, when the relative dielectric constants of the first dielectric material block 110, the second dielectric material block 120, and the bonding layer 130 are increased, the size of the antenna 100 may be reduced.

In this instance, when the relative dielectric constant of the dielectric material blocks of the antenna 100 is increased, a conductor loss caused by the first feed via 11, the first feed pattern 21, and the antenna patch 31 may be increased.

However, according to the antenna 100 according to the present embodiment, the relative dielectric constant of the first dielectric material block 110 may be less than the relative dielectric constant of the second dielectric material block 120, the first feed via 11 may be positioned in the first dielectric material block 110 with a relatively small relative dielectric constant, and may not be positioned in the second dielectric material block 120 with a relatively big relative dielectric constant. Therefore, the conductor loss by the first feed via 11 may be reduced, and deterioration of efficiency of the antenna 100 may be prevented, thereby increasing a gain of the antenna 100.

Further, by forming the second thickness T2 of the second dielectric material block 120 with a relatively big relative dielectric constant to be greater than the first thickness T1 of the first dielectric material block 110 with a relatively small relative dielectric constant, an entire relative dielectric constant of the first dielectric material block 110 and the second dielectric material block 120 may be increased, thereby increasing the gain of the antenna 100 and reducing the size of the antenna 100.

Not the antenna patch 31 but the bonding layer 130 may be positioned between the second dielectric material block 120 and the first feed pattern 21. Therefore, as shown in FIG. 3, the electric signal applied to the first feed pattern 21 may be transmitted (C) without interruption of the metal layer to the second dielectric material block 120 with a relatively big relative dielectric constant and a relatively big thickness in the third direction DR3. A resonance frequency may be generated in the second dielectric material block 120 positioned on the first dielectric material block 110, and by this, the efficiency of the antenna 100 may be increased without increasing the lengths (a and b) of the antenna 100 in the first direction DR1 and the second direction DR2. The gain and the frequency band of the antenna 100 may be increased.

The efficiency of the antenna 100 may be increased by additionally transmitting and receiving the electric signal by use of the antenna patch 31 positioned between the first dielectric material block 110 and the second dielectric material block 120, and the antenna patch 31 is disposed near the bonding layer 130 with a relatively small relative dielectric constant, so the conductor loss according to the antenna patch 31 may be reduced and the gain of the antenna 100 may be increased.

As shown in FIG. 2, the first feed via 11 is disposed near an edge of the antenna 100 on a plane formed where the first direction DR1 traverses the second direction DR2. By disposing the first feed via 11 to be near the edge of the antenna 100 as described above, the electric signal is applied along the edge of the antenna 100, and the desired resonance frequency may be generated without increasing the size of the antenna 100.

The antenna patch 31 may include a first groove portion 311 formed in the edge disposed near the first feed pattern 21, and a plane shape of the first groove portion 311 may correspond to a plane shape of the edge of the first feed pattern 21. As the first groove portion 311 is formed in the antenna patch 31 as described above, the first feed pattern 21 and the antenna patch 31 may be disposed to be spaced from each other without reducing the plane size of the antenna 100 and the entire size of the antenna patch 31.

In addition, by including the antenna patch 31 positioned between the first dielectric material block 110 and the second dielectric material block 120 and fed by capacitive coupling with the first feed pattern 21, a bandwidth of the antenna 100 may be widened and the gain of the antenna 100 may be increased through additional frequency resonance by the antenna patch 31 without hindering the electric signal applied to the second dielectric material block 120.

As described, according to the antenna 100 according to an embodiment, the antenna 100 may be installed in a narrow region, the frequency band of the antenna 100 may be increased, and the gain of the antenna 100 may be increased.

Figure 4:
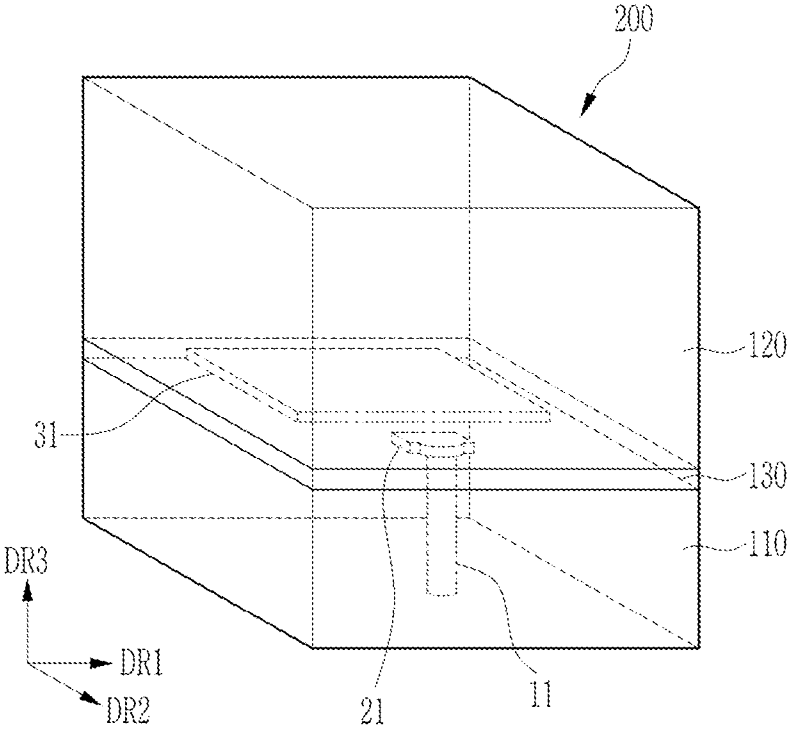
FIG. 4 shows a perspective view of a dielectric resonator antenna according to another embodiment.

An antenna 200 according to another embodiment will now be described with reference to FIG. 4 and FIG. 5. FIG. 4 shows a perspective view of a dielectric resonator antenna according to another embodiment, and FIG. 5 shows a cross-sectional view of a dielectric resonator antenna shown in FIG. 4.

Figure 5:
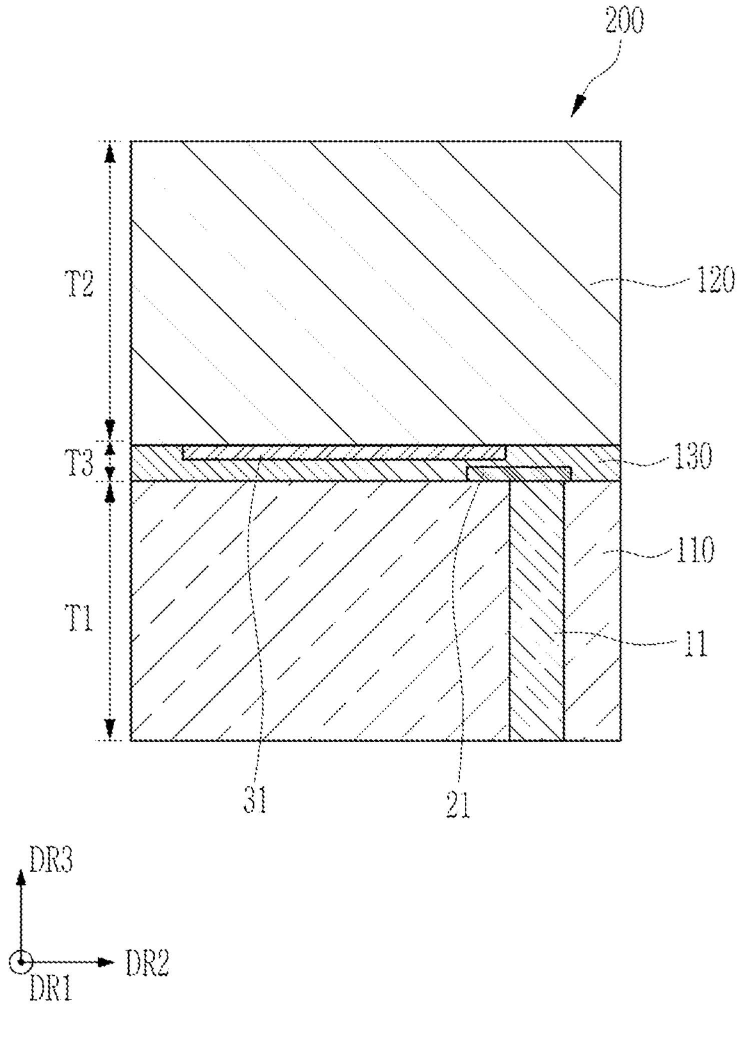
FIG. 5 shows a cross-sectional view of a dielectric resonator antenna shown in FIG. 4.

Referring to FIG. 4 and FIG. 5, the antenna 200 according to the present embodiment is similar to the antenna 100 according to an embodiment described with reference to FIG. 1 to FIG. 3.

The antenna 200 includes: a first dielectric material block 110 and a second dielectric material block 120 stacked in the third direction DR3; a bonding layer 130 disposed between the first dielectric material block 110 and the second dielectric material block 120 and bonding the first dielectric material block 110 and the second dielectric material block 120; a first feed via 11 positioned in the first dielectric material block 110; a first feed pattern 21 positioned between the first dielectric material block 110 and the second dielectric material block 120 and connected to the first feed via 11; and an antenna patch 31 positioned between the first dielectric material block 110 and the second dielectric material block 120 and disposed to be spaced from the first feed pattern 21. The antenna patch 31 is spaced from the first feed pattern 21 and is coupled to the same, so it may receive the electric signal through the first feed via 11 and the first feed pattern 21. A metal layer may not be positioned between the first feed pattern 21 and the second dielectric material block 120. No detailed descriptions on the same constituent elements as the antenna 100 according to an embodiment described with reference to FIG. 1 to FIG. 3 will be repeated here.

According to the antenna 200 according to the present embodiment, differing from the antenna 100 according to an embodiment described with reference to FIG. 1 to FIG. 3, the first feed pattern 21 may be positioned between the first dielectric material block 110 and the bonding layer 130 in the third direction DR3, and the antenna patch 31 may be positioned between the bonding layer 130 and the second dielectric material block 120 in the third direction DR3.

A portion of the first feed pattern 21 may overlap the antenna patch 31 in the third direction DR3. By this, the size of the antenna patch 31 may be increased while capacitive-coupling the first feed pattern 21 and the antenna patch 31 without increasing the size of the antenna 200 in the first direction DR1 and the second direction DR2.

Further, a remaining portion of the first feed pattern 21 does not overlap the antenna patch 31 in the third direction DR3, so not the metal layer but the bonding layer 130 may be positioned between the remaining portion of the first feed pattern 21 and the second dielectric material block 120. By this, the electric signal transmitted through the first feed via 11 and the first feed pattern 21 may be transmitted to the second dielectric material block 120 without an interruption of the metal layer, and the second dielectric material block 120 may generate a resonance frequency.

Many characteristics of the antenna 100 according to an embodiment described with reference to FIG. 1 to FIG. 3 are applicable to the antenna 200 according to the present embodiment.

Figure 6:
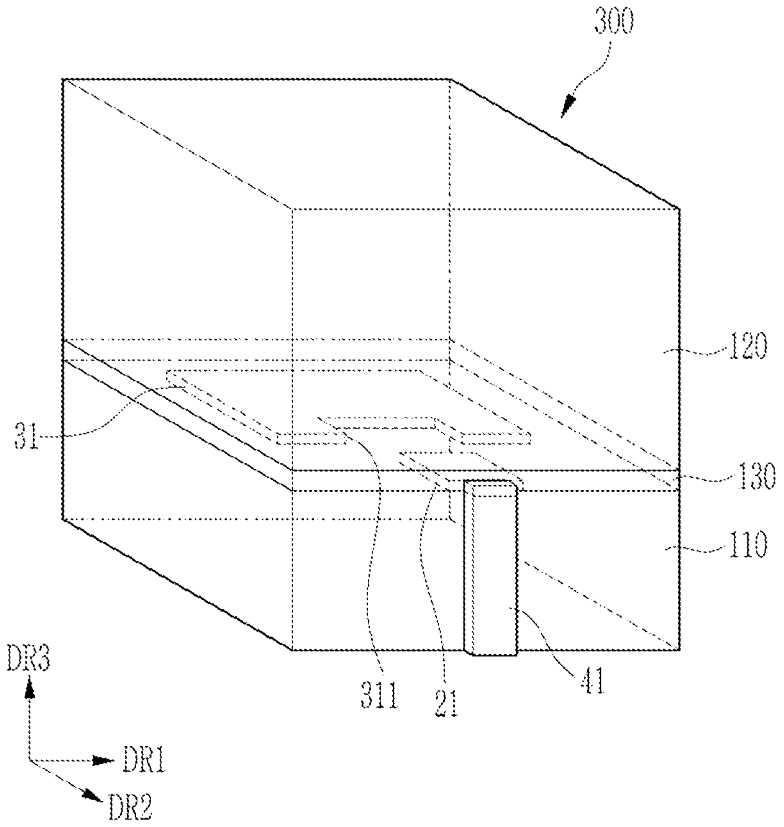
FIG. 6 shows a perspective view of a dielectric resonator antenna according to another embodiment.

An antenna 300 according to another embodiment will now be described with reference to FIG. 6 and FIG. 7. FIG. 6 shows a perspective view of a dielectric resonator antenna according to another embodiment, and FIG. 7 shows a cross-sectional view of a dielectric resonator antenna shown in FIG. 6.

Figure 7:
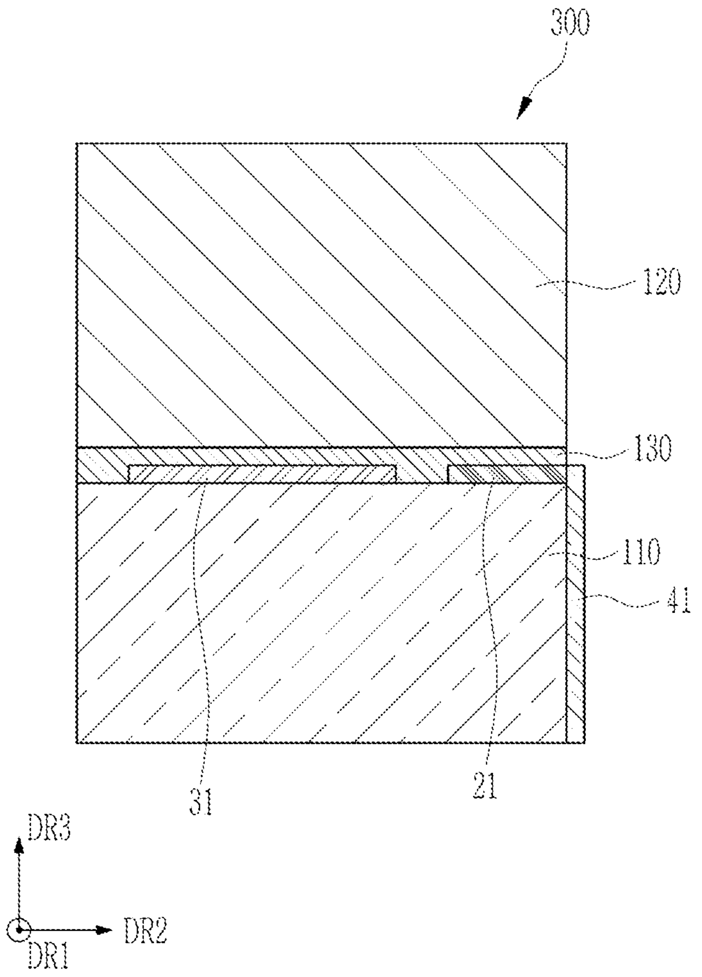
FIG. 7 shows a cross-sectional view of a dielectric resonator antenna shown in FIG. 6.

Referring to FIG. 6 and FIG. 7, the antenna 300 according to the present embodiment is similar to the antenna 100 according to an embodiment described with reference to FIG. 1 to FIG. 3.

The antenna 300 includes: a first dielectric material block 110 and a second dielectric material block 120 stacked in the third direction DR3; a bonding layer 130 positioned between the first dielectric material block 110 and the second dielectric material block 120 and bonding the first dielectric material block 110 and the second dielectric material block 120; a first feed pattern 21 positioned between the first dielectric material block 110 and the second dielectric material block 120; and an antenna patch 31 positioned between the first dielectric material block 110 and the second dielectric material block 120 and disposed to be spaced from the first feed pattern 21. A metal layer may not be positioned between the first feed pattern 21 and the second dielectric material block 120. No detailed descriptions on the same constituent elements as the antenna 100 according to an embodiment described with reference to FIG. 1 to FIG. 3 will be repeated.

Differing from the antenna 100 according to an embodiment described with reference to FIG. 1 to FIG. 3, the antenna 300 according to the present embodiment may include a first feed strip 41 positioned on a side of the first dielectric material block 110.

The first feed strip 41 of the antenna 300 may be connected to the first feed pattern 21 positioned on the first dielectric material block 110. The first feed strip 41 may be a feeder of the antenna 300.

The first feed pattern 21 may be disposed to be spaced from the antenna patch 31 in one plane formed where the first direction DR1 traverses the second direction DR2, and the first feed pattern 21 and the antenna patch 31 are coupled, so the antenna patch 31 may be fed by a capacitive coupled feeding method through the first feed pattern 21.

The antenna patch 31 may include a groove portion 311 formed in the edge disposed near the first feed strip 41. However, according to another embodiment, the antenna patch 31 may not have the groove portion 311.

The electric signal applied to the first feed strip 41 is transmitted to the first dielectric material block 110 and the second dielectric material block 120 to generate a resonance frequency, and it is transmitted to the antenna patch 31 through the first feed pattern 21 to additionally transmit and receive the electric signal, thereby increasing the efficiency of the dielectric resonator antenna 300.

Many characteristics of the dielectric resonator antenna 100 according to an embodiment described with reference to FIG. 1 to FIG. 3 and the dielectric resonator antenna 200 according to an embodiment described with reference to FIG. 4 and FIG. 5 are applicable to the dielectric resonator antenna 300 according to the present embodiment.

Figure 8:
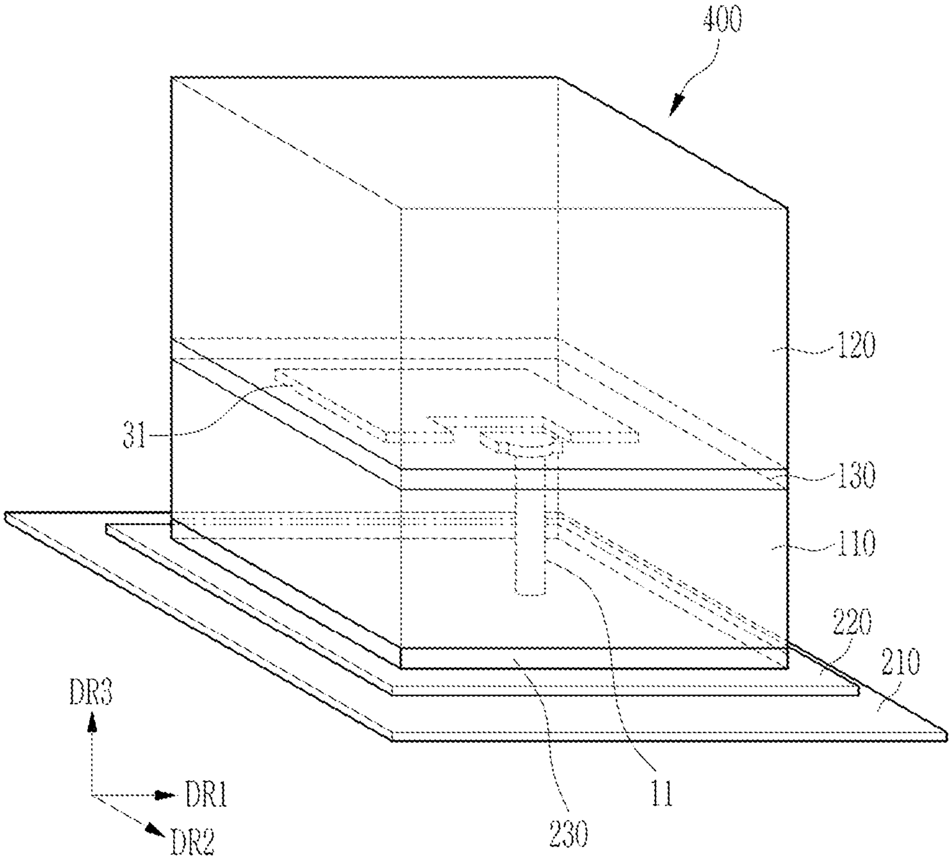
FIG. 8 shows a perspective view of a dielectric resonator antenna module according to an embodiment.
Figure 9:
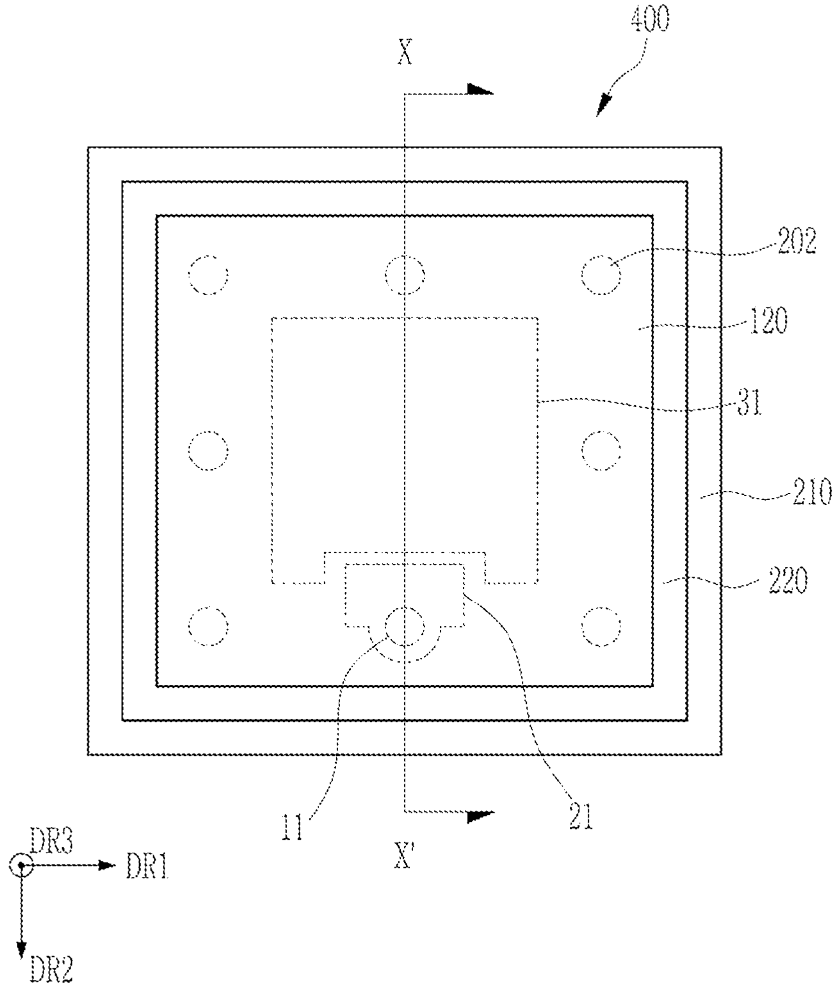
FIG. 9 shows a top plan view of a dielectric resonator antenna module of FIG. 8.
Figure 10:
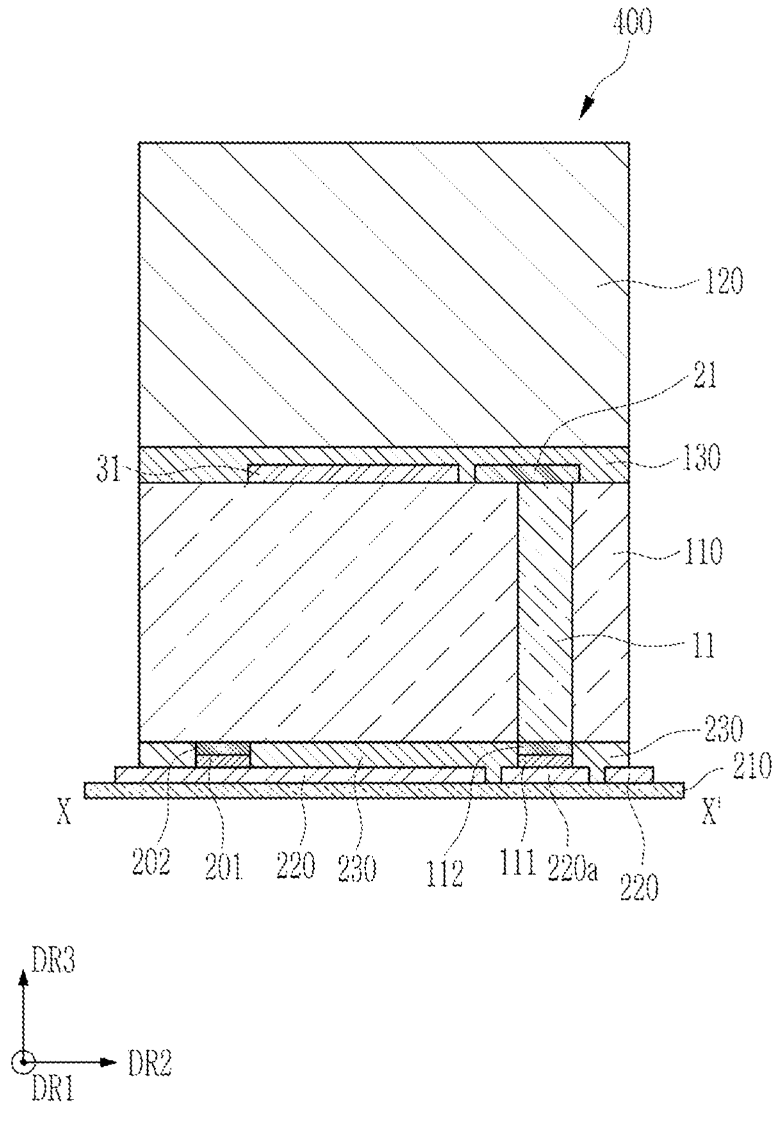
FIG. 10 shows a cross-sectional view with respect to a line X-X' of FIG. 9.

A dielectric resonator antenna module 400 according to an embodiment will now be described with reference to FIG. 8 to FIG. 10. FIG. 8 shows a perspective view of a dielectric resonator antenna module according to an embodiment, FIG. 9 shows a top plan view of a dielectric resonator antenna module of FIG. 8, and FIG. 10 shows a cross-sectional view with respect to a line X-X' of FIG. 9.

The dielectric resonator antenna module 400 according to the present embodiment may include a dielectric resonator antenna 100 positioned on a substrate 210. The dielectric resonator antenna 100 positioned on the substrate 210 is similar to the dielectric resonator antenna 100 according to an embodiment described with reference to FIG. 1 to FIG. 3.

The dielectric resonator antenna 100 includes: a first dielectric material block 110 and a second dielectric material block 120 stacked in the third direction DR3; a bonding layer 130 positioned between the first dielectric material block 110 and the second dielectric material block 120 and bonding the first dielectric material block 110 and the second dielectric material block 120; a first feed via 11 positioned in the first dielectric material block 110; a first feed pattern 21 positioned between the first dielectric material block 110 and the second dielectric material block 120 and connected to the first feed via 11; and an antenna patch 31 positioned between the first dielectric material block 110 and the second dielectric material block 120 and disposed to be spaced from the first feed pattern 21. The antenna patch 31 is spaced from the first feed pattern 21 and is coupled to the same, so it may receive the electric signal through the first feed via 11 and the first feed pattern 21. A metal layer may not be positioned between the first feed pattern 21 and the second dielectric material block 120. No detailed descriptions on the same constituent elements as the dielectric resonator antenna 100 according to an embodiment described with reference to FIG. 1 to FIG. 3 will be repeated.

A ground electrode 220 and a feed wire **220*a* are positioned on the substrate 210, and the ground electrode 220 and the feed wire 220*a* are disposed to be spaced from each other in an insulated way. That is, the feed wire 220*a* for supplying an electric signal to the dielectric resonator antenna may be positioned on the substrate 210, and the ground electrode 220 may be disposed to expand to a portion that is around the edge of the substrate 210 from a peripheral portion of the feed wire 220***a*.

The first feed via 11 penetrating through the first dielectric material block 110 is connected to the feed wire 220*a* through a solder ball 111 and a first contact pad 112, so the first feed via 11 may be electrically connected to the substrate 210.

Referring to FIG. 9, the dielectric resonator antenna module 400 according to the present embodiment may include a plurality of dummy pad units 202 positioned between the substrate 210 and the first dielectric material block 110.

The dummy pad units 202 may be positioned on a portion in which the first feed via 11 is not positioned, so a gap between the substrate 210 and the first dielectric material block 110 may be maintained on the portion in which the first feed via 11 is not positioned, while the dummy pad units 202 may be connected to the ground electrode 220 of the substrate 210 through the dummy solder ball 201, and the first dielectric material block 110 may be attached to the substrate 210.

The dummy pad units 202 may be uniformly disposed so that they may be disposed at regular intervals along the edge of the first dielectric material block 110 in the first direction DR1 and the second direction DR2 together with the first contact pad 112, and hence, distribution of electric signals applied to the dummy pad units 202 and the first contact pad 112 positioned below the first dielectric material block 110 may also be uniform. Therefore, the electric signals of the dielectric resonator antenna module 400 may be prevented from being distorted depending on positions on the combined portion between the substrate 210 and the dielectric resonator antenna 100.

An underfill material 230 may be positioned between the substrate 210 and the first dielectric material block 110. When the first dielectric material block 110 is mounted on the substrate 210, the first feed via 11 may be connected to the feed wire 220*a* through the solder ball 111 and the first contact pad 112, the first dielectric material block 110 may be connected to the ground electrode 220 through the dummy solder ball and a plurality of dummy pad units 202, and a space between the first dielectric material block 110 and the substrate 210 may be filled with the underfill material 230 and then the underfill material 230 may be cured. The cured underfill material 230 may be formed so that the first contact pad 112 and the dummy pad units 202 may surround the portion connected to the feed wire 220*a* and the ground electrode 220 through the solder ball 111 and the dummy solder ball 201, and may support so that the first dielectric material block 110 may be firmly fixed to the substrate 210. The underfill material 230 may fill the space between the first dielectric material block 110 and the substrate 210 to prevent permeation of external dust or moisture and destruction or erroneous operation of insulation at the connection unit.

The dielectric resonator antenna module 400 according to the present embodiment has been described to include the dielectric resonator antenna 100 according to an embodiment described with reference to FIG. 1 to FIG. 3, and without being limited thereto, the dielectric resonator antenna module according to another embodiment may include one of the dielectric resonator antennas 100, 200, and 300. Many characteristics of the dielectric resonator antennas 100, 200, and 300 are applicable to the dielectric resonator antenna module 400 according to the present embodiment.

Figure 11:
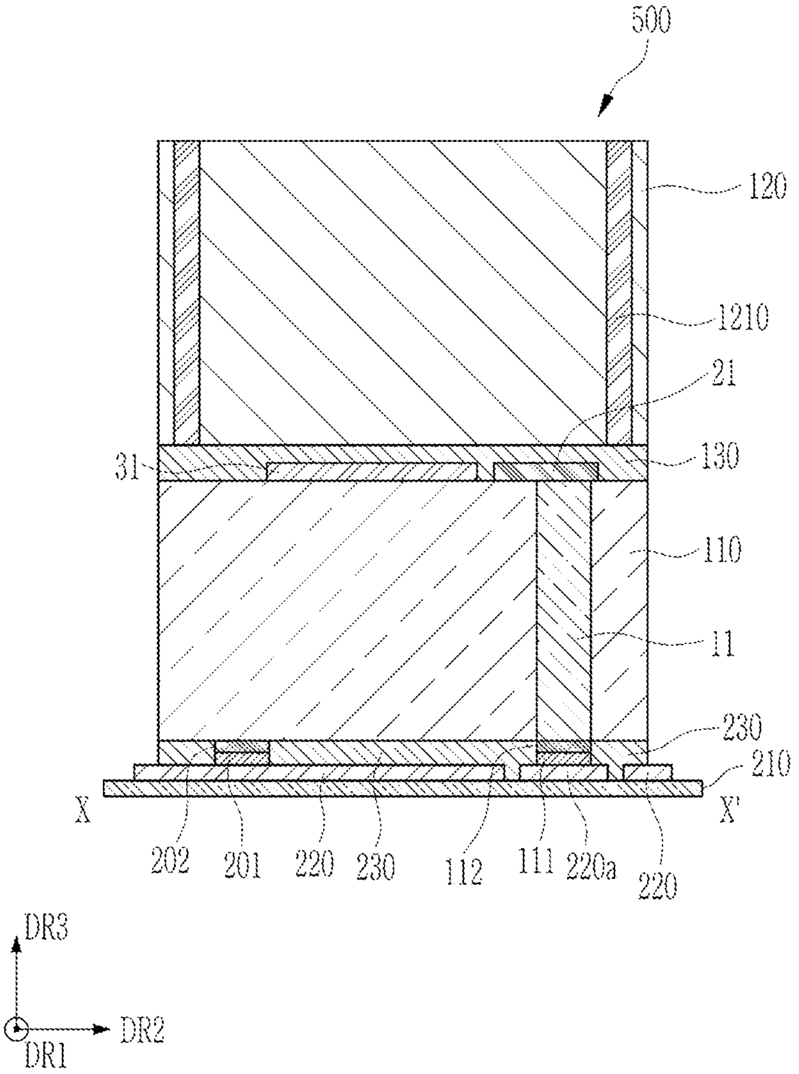
FIG. 11 shows a cross-sectional view of a dielectric resonator antenna module according to another embodiment.

A dielectric resonator antenna module 500 according to another embodiment will now be described with reference to FIG. 11 and FIG. 12. FIG. 11 shows a cross-sectional view of a dielectric resonator antenna module according to another embodiment, and FIG. 12 shows a top plan view of a dielectric resonator antenna module of FIG. 11.

Figure 12:
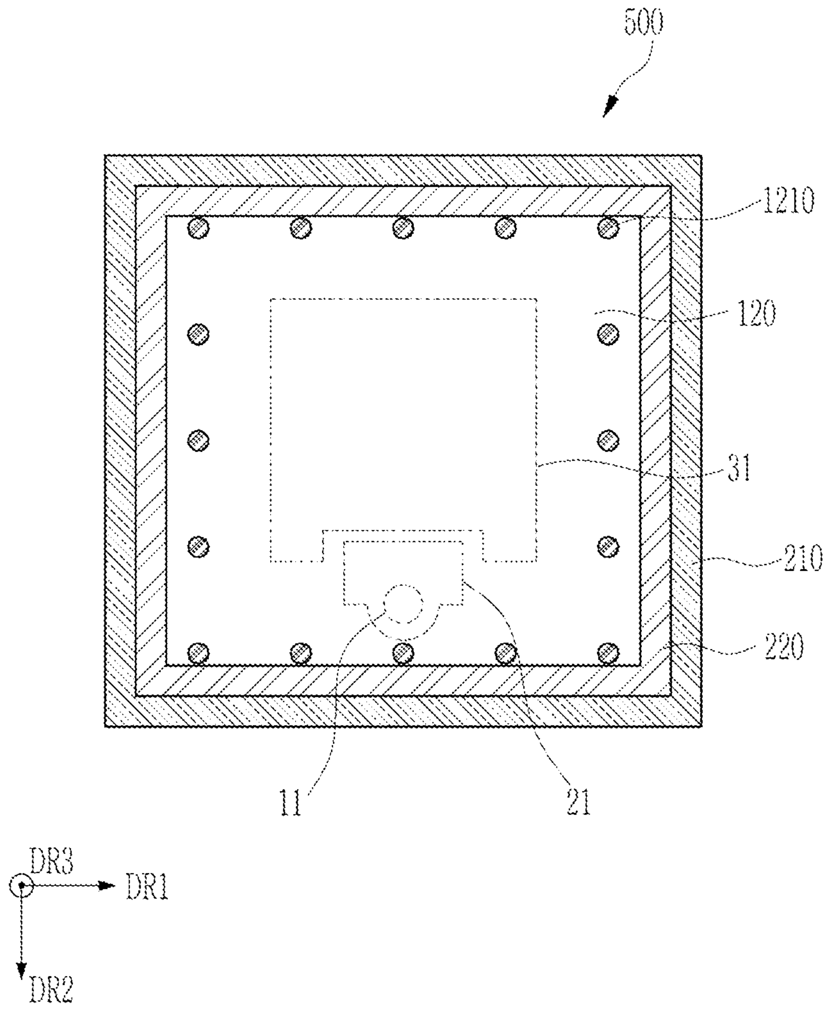
FIG. 12 shows a top plan view of a dielectric resonator antenna module of FIG. 11.

Referring to FIG. 11 and FIG. 12, the dielectric resonator antenna module 500 according to the present embodiment is similar to the dielectric resonator antenna module 400 according to an embodiment described with reference to FIG. 8 to FIG. 10. No same constituent elements will be described in further detail.

According to the dielectric resonator antenna module 500 according to the present embodiment, differing from the dielectric resonator antenna module 400 according to an embodiment described with reference to FIG. 8 to FIG. 10, a plurality of shield vias 1210 may be positioned along the edge on a plane formed where the first direction DR1 and the second direction DR2 of the second dielectric material block 120 traverse each other. That is, the plurality of shield vias 1210 may be disposed at intervals to form a via wall near internal sides of four edges of the second dielectric material block 120 in a rectangular shape or a square planar shape. The shield vias 1210 may penetrate through the second dielectric material block 120.

By forming the plurality of shield vias 1210 in the second dielectric material block 120, a loss of electrical energy and a change of propagation patterns generated when the relative dielectric constant and the thickness of the second dielectric material block 120 are increased may be prevented.

In the present embodiment, the plurality of shield vias 1210 have been described to be arranged on the inside along a circumference of the second dielectric material block 120, and the position and the arrangement of the shield vias 1210 are changeable.

The dielectric material resonator antenna module 500 has been illustrated to include the dielectric resonator antenna 100 according to an embodiment described with reference to FIG. 1 to FIG. 3, and without being limited thereto, the dielectric resonator antenna module according to another embodiment may include one of the dielectric resonator antennas 100, 200, and 300. Many characteristics of the above-described dielectric resonator antennas 100, 200, and 300 are applicable to the dielectric resonator antenna module 500 according to the present embodiment.

Figure 13:
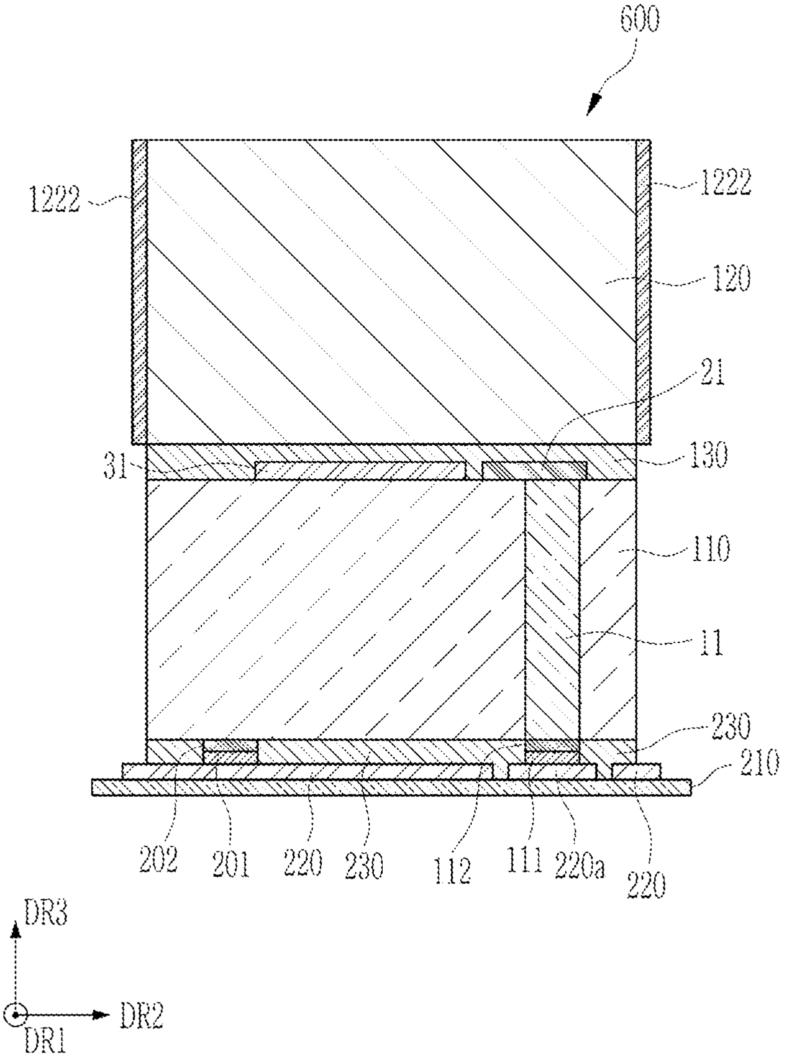
FIG. 13 shows a cross-sectional view of a dielectric resonator antenna module according to another embodiment.

A dielectric resonator antenna module 600 according to another embodiment will now be described with reference to FIG. 13 and FIG. 14. FIG. 13 shows a cross-sectional view of a dielectric resonator antenna module according to another embodiment, and FIG. 14 shows a top plan view of a dielectric resonator antenna module of FIG. 13.

Figure 14:
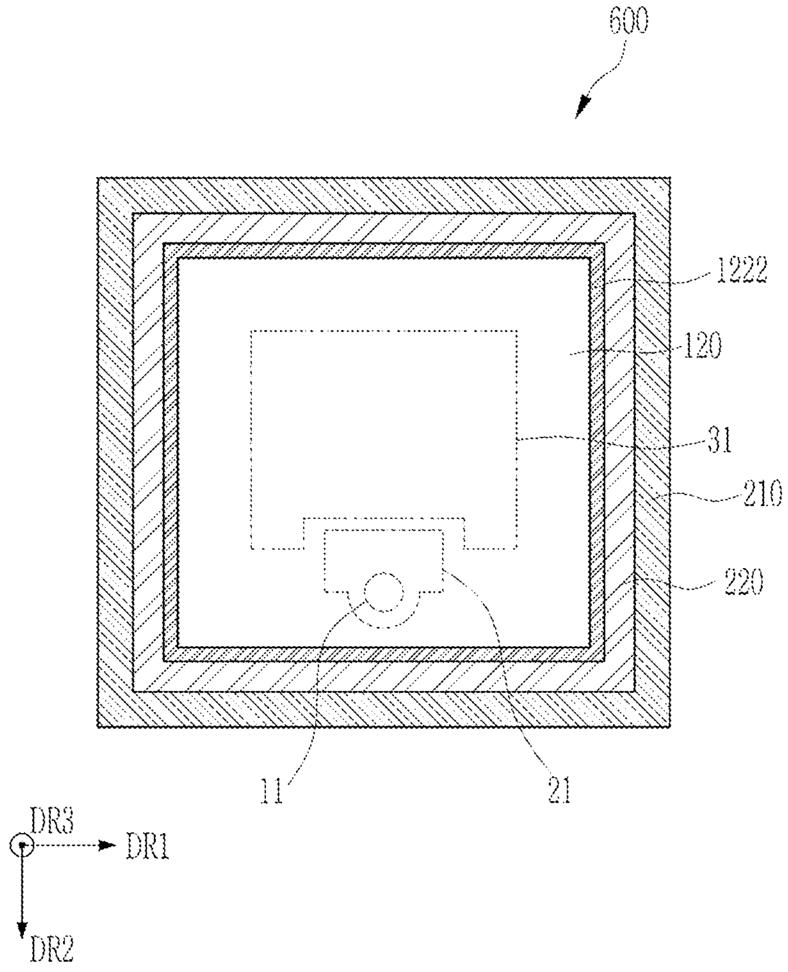
FIG. 14 shows a top plan view of a dielectric resonator antenna module of FIG. 13.

Referring to FIG. 13 and FIG. 14, the dielectric resonator antenna module 600 according to the present embodiment is similar to the dielectric resonator antenna module 400 according to an embodiment described with reference to FIG. 8 to FIG. 10. No same constituent elements will be described in further detail.

Differing from the dielectric resonator antenna module 400 according to an embodiment described with reference to FIG. 8 to FIG. 10, the dielectric resonator antenna module 600 according to the present embodiment may include a metallic wall 1222 disposed on an external surface along the circumference of the second dielectric material block 120. That is, the metallic wall 1222 may be formed along the external lateral surface of the four respective edges of the second dielectric material block 120 in a rectangular shape or a square planar shape. The metallic wall 1222 may be formed to surround the second dielectric material block 120 on a plane formed where the first direction DR1 traverses the second direction DR2, and the metallic wall 1222 may extend to an upper side from a lower side of the second dielectric material block 120 in the third direction DR3.

By forming the metallic wall 1222 on the outside of the second dielectric material block 120, the loss of electrical energy and the change of the propagation pattern generated may be prevented or decreased when the relative dielectric constant and the thickness of the second dielectric material block 120 are increased.

The dielectric resonator antenna module 600 according to the present embodiment has been illustrated to include the dielectric resonator antenna 100 according to an embodiment described with reference to FIG. 1 to FIG. 3, and without being limited thereto, the antenna module according to another embodiment may include one of the above-described dielectric resonator antennas 100, 200, and 300. Many characteristics of the dielectric resonator antennas 100, 200, and 300 are applicable to the dielectric resonator antenna module 600 according to the present embodiment.

Figure 15:
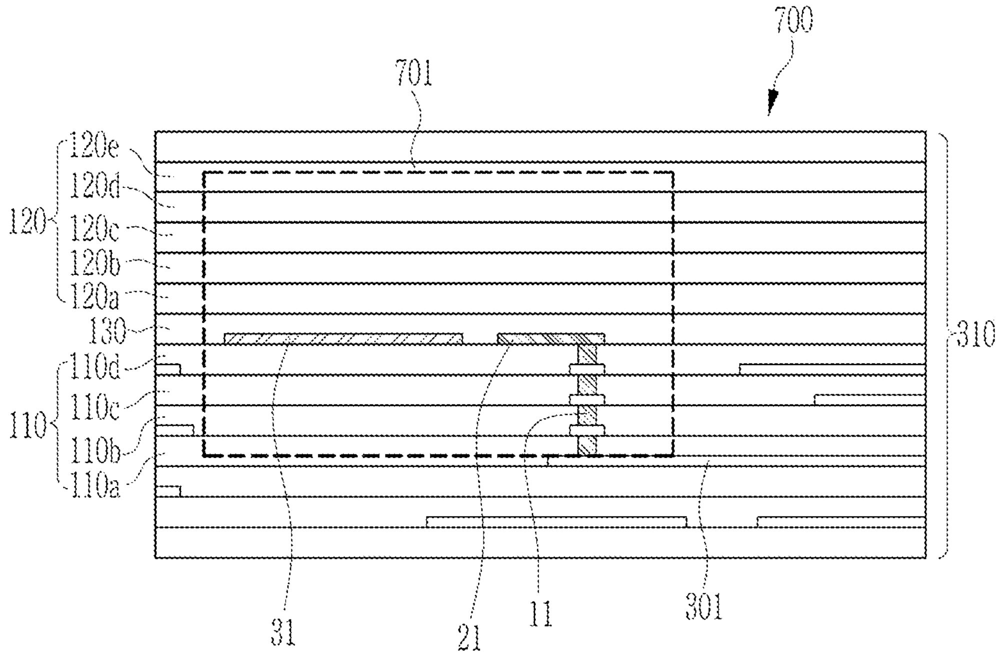
FIG. 15 shows a cross-sectional view of a dielectric resonator antenna module according to another embodiment.

A dielectric resonator antenna module 700 according to another embodiment will now be described with reference to FIG. 15. FIG. 15 shows a cross-sectional view of a dielectric resonator antenna module according to another embodiment.

Referring to FIG. 15, the dielectric resonator antenna module 700 according to the present embodiment includes a dielectric resonator antenna 701 installed in the substrate 310 configuring a printed circuit board (PCB).

The dielectric resonator antenna 701 may include: a first dielectric material block 110; a second dielectric material block 120 positioned on the first dielectric material block 110; a bonding layer 130 positioned between the first dielectric material block 110 and the second dielectric material block 120; a first feed via 11 penetrating through the first dielectric material block 110; a first feed pattern 21 positioned between the first dielectric material block 110 and the second dielectric material block 120 and connected to the first feed via 11; and an antenna patch 31 positioned between the first dielectric material block 110 and the second dielectric material block 120 and disposed to be spaced from the first feed pattern 21.

The first dielectric material block 110 may include a plurality of first dielectric layers 110*a*, 110*b*, 110*c*, and 110*d*, and the second dielectric material block 120 may include a plurality of dielectric layers 120*a*, 120*b*, 120*c*, 120*d*, and 120*e*.

A metal wire 301 for applying a RF signal may be positioned in the substrate 310, and the first feed via 11 may be positioned in the first dielectric material block 110 positioned on the metal wire 301. The first feed via 11 may be connected to the metal wire 301, and may receive an electric signal from the metal wire 301.

No other metal layers except for the first feed via 11 may be positioned among the plurality of first dielectric layers 110*a*, 110*b*, 110*c*, and 110*d* included by the first dielectric material block 110.

A first feed pattern 21 connected to the first feed via 11, and an antenna patch 31 spaced from the first feed pattern 21 and coupled to the first feed pattern 21 may be positioned on the first dielectric material block 110.

The first feed pattern 21 and the antenna patch 31 may be disposed on a same layer to be spaced in the first direction DR1. However, in a like manner to the antenna 200 according to an embodiment described with reference to FIG. 4 and FIG. 5, the first feed pattern 21 and the antenna patch 31 may be positioned on different layers to be spaced in the third direction DR3. As described, the first feed pattern 21 may be disposed to be spaced from the antenna patch 31, and the first feed pattern 21 and the antenna patch 31 may be coupled to each other so the antenna patch 31 may be fed through the first feed pattern 21 according to the capacitive coupled feeding method.

A bonding layer 130 is positioned on the first feed pattern 21 and the antenna patch 31. The bonding layer 130 may be a single-layer dielectric layer, it may include a multilayered dielectric layer, the bonding layer 130 may be one of the plurality of first dielectric layers 110*a*, 110*b*, 110*c*, and 110*d*, and may be one of the plurality of dielectric layers 120*a*, 120*b*, 120*c*, 120*d*, and 120*e*. However, in a like manner of the above-described dielectric resonator antenna 200 according to an embodiment described with reference to FIG. 4 and FIG. 5, the first feed pattern 21 may be positioned between the first dielectric material block 110 and the bonding layer 130, and the antenna patch 31 may be positioned between the bonding layer 130 and the second dielectric material block 120.

A second dielectric material block 120 may be positioned on the bonding layer 130. The metal layer may not be positioned between the first feed pattern 21 and the second dielectric material block 120, and by this, the electric signal applied to the first feed pattern 21 may be well transmitted to the second dielectric material block 120.

When an electric signal is applied to the first feed via 11, resonance with a predetermined frequency is generated inside the first dielectric material block 110 including the plurality of first dielectric layers 110*a*, 110*b*, 110*c*, and 110*d* and the second dielectric material block 120 including the plurality of dielectric layers 120*a*, 120*b*, 120*c*, 120*d*, and 120*e*, the RF signal may be transmitted and received according to the resonance frequency, and the electric signal is additionally transmitted and received by using the antenna patch 31 positioned between the first dielectric material block 110 and the second dielectric material block 120, thereby increasing the efficiency of the dielectric resonator antenna 701.

Many characteristics of the dielectric resonator antennas 100, 200, and 300 according to embodiments are applicable to the dielectric resonator antenna 701 of the dielectric resonator antenna module 700 according to the present embodiment.

Figure 16:
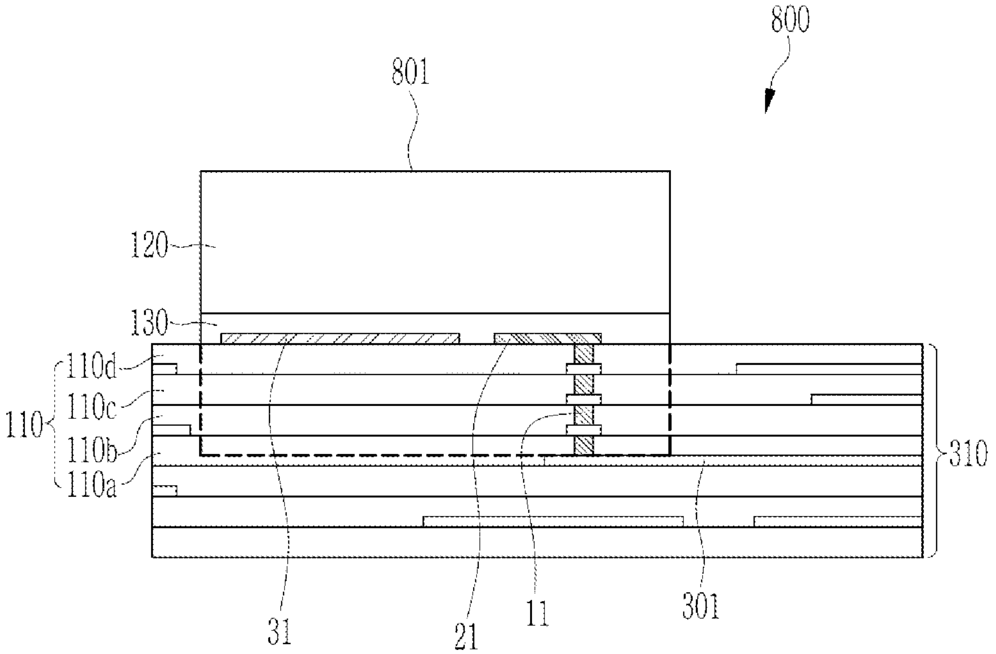
FIG. 16 shows a cross-sectional view of a dielectric resonator antenna module according to another embodiment.

A dielectric resonator antenna module 800 according to another embodiment will now be described with reference to FIG. 16. FIG. 16 shows a cross-sectional view of a dielectric resonator antenna module according to another embodiment.

Referring to FIG. 16, the dielectric resonator antenna module 800 includes a dielectric resonator antenna 801, and the dielectric resonator antenna 801 includes a first dielectric material block 110 including a plurality of first dielectric layers 110*a*, 110*b*, 110*c*, and 110*d* of a substrate 310 configuring a printed circuit board (PCB), a first feed via 11 penetrating through the first dielectric material block 110, a first feed pattern 21 and an antenna patch 31 positioned on the substrate 310, a second dielectric material block 120 positioned on the first feed pattern 21 and the antenna patch 31, and a bonding layer 130 positioned between the first dielectric material block 110 and the second dielectric material block 120.

A metal wire 301 for applying an RF signal is positioned in the substrate 310, and a first feed via 11 is positioned in the first dielectric material block 110 positioned on the metal wire 301. The first feed via 11 may be connected to the metal wire 301 to receive the electric signal from the metal wire 301.

No other metal layers but the first feed via 11 may be positioned among the plurality of first dielectric layers 110*a*, 110*b*, 110*c*, and 110*d* included by the first dielectric material block 110.

A first feed pattern 21 connected to the first feed via 11, and an antenna patch 31 disposed to be spaced from the first feed pattern 21 and coupled to the first feed pattern 21 may be positioned on the first dielectric material block 110.

The first feed pattern 21 and the antenna patch 31 may be disposed on a same layer to be spaced from each other in the first direction DR1. However, in a like manner of the dielectric resonator antenna 200 according to an embodiment described with reference to FIG. 4 and FIG. 5, the first feed pattern 21 and the antenna patch 31 may be positioned on different layers so as to be spaced from each other in the third direction DR3. As described, the first feed pattern 21 may be disposed to be spaced from the antenna patch 31, the first feed pattern 21 and the antenna patch 31 are coupled to each other, so the antenna patch 31 may be fed through the first feed pattern 21 by the capacitive coupled feeding method.

A bonding layer 130 is positioned on the first feed pattern 21 and the antenna patch 31. However, in a similar way to the dielectric resonator antenna 200 according to an embodiment described with reference to FIG. 4 and FIG. 5, the bonding layer 130 may be positioned on the first feed pattern 21, and the antenna patch 31 may be positioned on the bonding layer 130.

A second dielectric material block 120 may be positioned on the bonding layer 130. The metal layer may not be positioned between the first feed pattern 21 and the second dielectric material block 120, and by this, the electric signal applied to the first feed pattern 21 may be well transmitted to the second dielectric material block 120.

Differing from the first dielectric material block 110 including the plurality of first dielectric layers 110*a*, 110*b*, 110*c*, and 110*d* configuring the substrate 310, the bonding layer 130 and the second dielectric material block 120 are individual layers positioned on the substrate 310 and may be respectively made of a dielectric layer.

When the electric signal is applied to the first feed via 11, resonance with a predetermined frequency is generated in the first dielectric material block 110 including the plurality of first dielectric layers 110*a*, 110*b*, 110*c*, and 110*d* and the second dielectric material block 120, the RF signal may be transmitted and received according to the resonance frequency, and the electric signal is additionally transmitted and received by using the antenna patch 31 positioned between the first dielectric material block 110 and the second dielectric material block 120, thereby increasing the efficiency of the dielectric resonator antenna 801.

Many characteristics of the dielectric resonator antennas 100, 200, and 300 according to embodiments are applicable to the antenna 801 of the dielectric resonator antenna module 800 according to the present embodiment.

Figure 17:
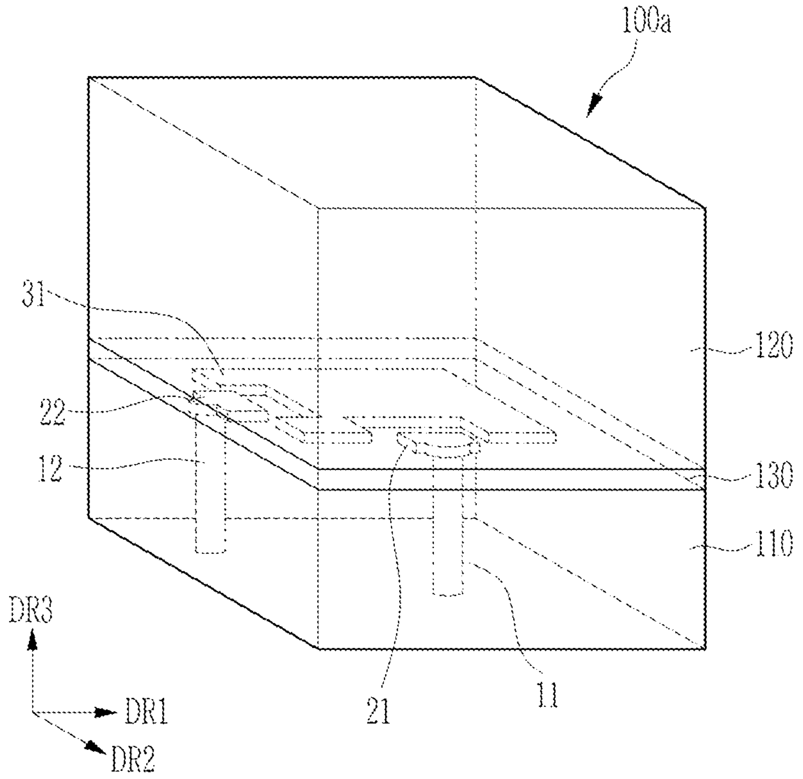
FIG. 17 shows a perspective view of a dielectric resonator antenna according to an embodiment.

A dielectric resonator antenna 100*a* according to another embodiment will now be described with reference to FIG. 17 to FIG. 19. FIG. 17 shows a perspective view of a dielectric resonator antenna according to an embodiment, FIG. 18 shows a top plan view of a dielectric resonator antenna according to an embodiment, and FIG. 19 shows a cross-sectional view with respect to a line XIX-XIX' of FIG. 18.

Figure 18:
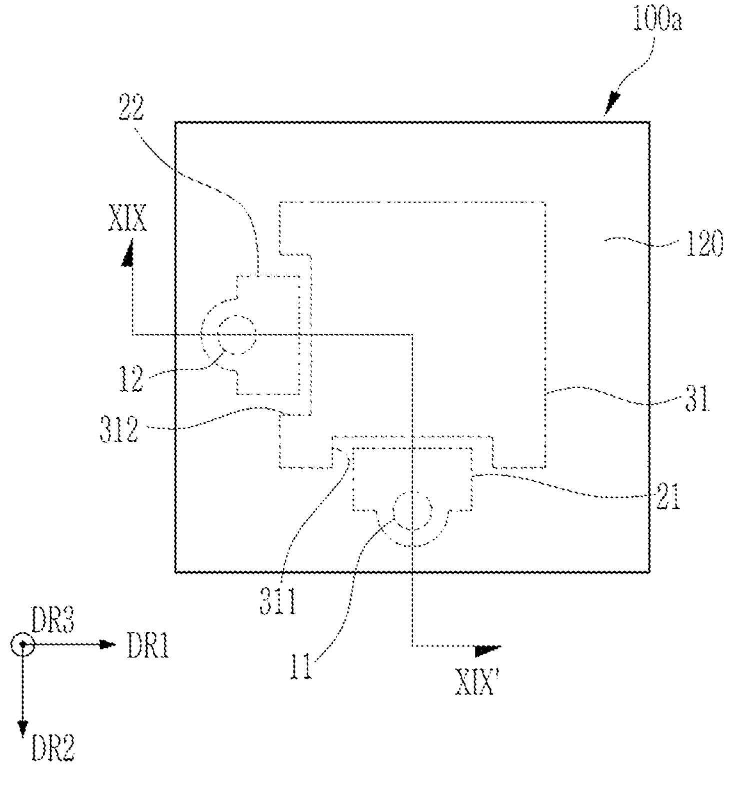
FIG. 18 shows a top plan view of a dielectric resonator antenna according to an embodiment.
Figure 19:
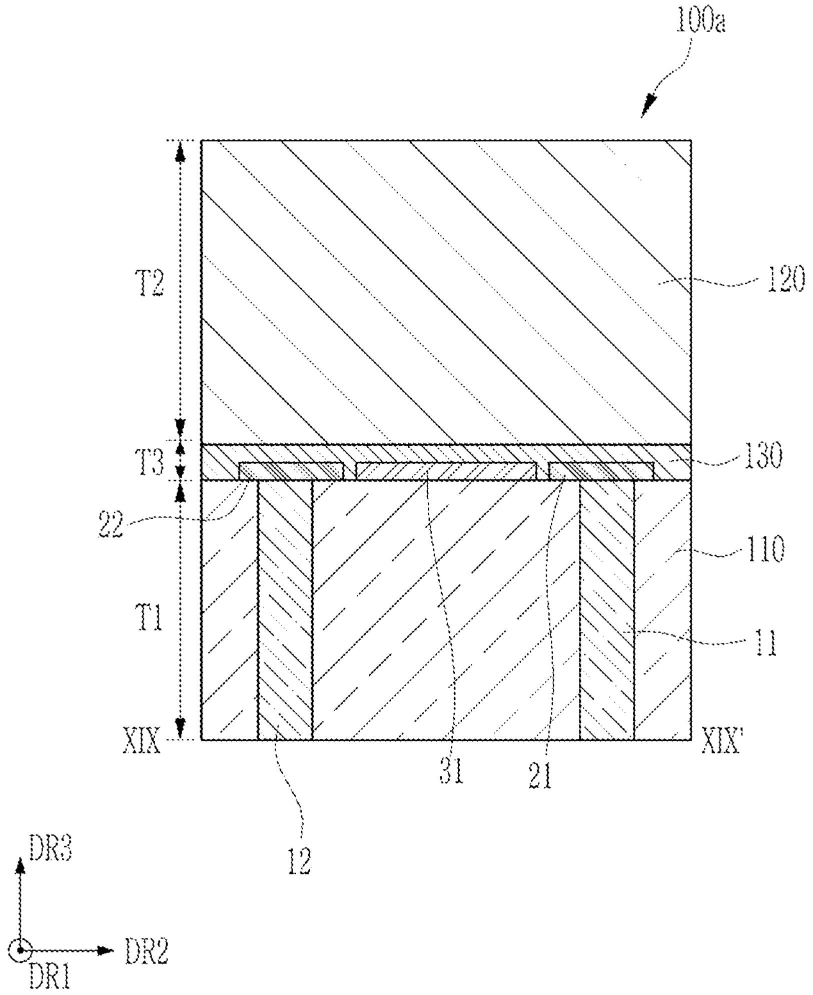
FIG. 19 shows a cross-sectional view with respect to a line XIX-XIX' of FIG. 18.

Referring to FIG. 17 to FIG. 19, the dielectric resonator antenna 100*a* includes: a first dielectric material block 110 and a second dielectric material block 120 that are stacked; a bonding layer 130 positioned between the first dielectric material block 110 and the second dielectric material block 120; a first feed via 11 and a second feed via 12 inserted into the first dielectric material block 110; and a first feed pattern 21, a second feed pattern 22, and an antenna patch 31 positioned between the first dielectric material block 110 and the bonding layer 130.

The first dielectric material block 110 and the second dielectric material block 120 are stacked with the bonding layer 130 therebetween in the third direction DR3. The bonding layer 130 may have adherence to bond the first dielectric material block 110 and the second dielectric material block 120.

The first dielectric material block 110 and the second dielectric material block 120 may have a same planar shape so that they may overlap each other in the third direction DR3, and for example, they may respectively have a rectangular parallelepiped shape. A first thickness T1 of the first dielectric material block 110 and a second thickness T2 of the second dielectric material block 120 measured in the third direction DR3 may be different from each other, and for example, the second thickness T2 of the second dielectric material block 120 may be greater than the first thickness T1 of the first dielectric material block 110.

A third thickness T3 of the bonding layer 130 measured in the third direction DR3 may be less than the first thickness T1 of the first dielectric material block 110 and the second thickness T2 of the second dielectric material block 120 measured in the third direction DR3.

The first dielectric material block 110 may have via holes into which the first feed via 11 and the second feed via 12 are inserted.

The first feed via 11 and the second feed via 12 may be connected to the first feed pattern 21 and the second feed pattern 22, respectively, positioned on the first dielectric material block 110. The antenna patch 31 positioned on the first dielectric material block 110 may be disposed to be spaced from the first feed pattern 21 and the second feed pattern 22 on one plane formed where the first direction DR1 traverses the second direction DR2.

The first feed pattern 21, the second feed pattern 22, and the antenna patch 31 may be positioned on the first dielectric material block 110 in the third direction DR3, and the bonding layer 130 may be positioned on the first feed pattern 21, the second feed pattern 22, and the antenna patch 31.

The first feed pattern 21 may, for example, have a rectangular or square planar shape, and may have a surface that is smaller than the surface of the first dielectric material block 110. The second feed pattern 22 may, for example, have a rectangular or square planar shape, and may have a surface that is smaller than the surface of the first dielectric material block 110.

The first feed pattern 21 and the second feed pattern 22 may be fed from the first feed via 11 and the second feed via 12, respectively.

The first feed via 11 may transmit a first polarization RF signal, and the second feed via 12 may transmit a second polarization RF signal. For example, the first polarization may be horizontal polarization, and the second polarization may be vertical polarization, and they are not limited thereto.

The antenna patch 31 is spaced from the first feed pattern 21 and the second feed pattern 22 fed from the first feed via 11 and the second feed via 12, respectively, and is coupled thereto, so the antenna patch 31 may be fed by the capacitive coupled feeding method.

The sizes and the shapes of the first feed pattern 21, the second feed pattern 22, and the antenna patch 31 are modifiable, and the degree of freedom of designing the antenna may be improved by changing the sizes and the shapes of the first feed pattern 21, the second feed pattern 22, and the antenna patch 31, and the gap among the first feed pattern 21, the second feed pattern 22, and the antenna patch 31.

Not the metal layer but the bonding layer 130 may be positioned between the second dielectric material block 120 and the first feed pattern 21, and between the second dielectric material block 120 and the second feed pattern 22. That is, the antenna patch 31 may not be positioned between the first feed pattern 21 and the second dielectric material block 120, and the antenna patch 31 may not be positioned between the second feed pattern 22 and the second dielectric material block 120.

The relative dielectric constant of the first dielectric material block 110 may be equal to or different from the relative dielectric constant of the second dielectric material block 120. In detail, the relative dielectric constant of the second dielectric material block 120 may be greater than the relative dielectric constant of the first dielectric material block 110.

The relative dielectric constant of the bonding layer 130 may be less than the relative dielectric constant of the first dielectric material block 110 and the relative dielectric constant of the second dielectric material block 120.

When the electric signal is applied to the first feed via 11 and the second feed via 12, resonance with a predetermined frequency is generated in the first dielectric material block 110, the second dielectric material block 120, and the bonding layer 130, and the first polarization RF signal and the second polarization RF signal may be transmitted and received according to the resonance frequency of the dielectric resonator antenna 100*a*.

According to the antenna 100*a* according to the present embodiment, the relative dielectric constant of the first dielectric material block 110 may be less than the relative dielectric constant of the second dielectric material block 120, and the first feed via 11 and the second feed via 12 may be positioned in the first dielectric material block 110 and not in the second dielectric material block 120. Therefore, deterioration of efficiency of the antenna 100*a* may be prevented by reducing the conductor loss caused by the first feed via 11 and the second feed via 12.

Further, by forming the second thickness T2 of the second dielectric material block 120 with a relatively big relative dielectric constant to be greater than the first thickness T1 of the first dielectric material block 110 with a relatively small relative dielectric constant, the relative dielectric constant of the dielectric resonator antenna 100*a* becomes big, and by this, the efficiency of the dielectric resonator antenna 100*a* may be increased and the size of the dielectric resonator antenna 100*a* may be reduced.

Further, not the antenna patch 31 but the bonding layer 130 may be positioned between the second dielectric material block 120 and the first feed pattern 21, and between the second dielectric material block 120 and the second feed pattern 22. Therefore, the electric signal applied to the first feed pattern 21 and the second feed pattern 22 may be transmitted to the second dielectric material block 120 with a relatively big relative dielectric constant and a relatively big thickness in the third direction DR3 without interference of the metal layer. The resonance frequency may also be generated in the second dielectric material block 120 positioned on the first dielectric material block 110, and by this, the efficiency of the dielectric resonator antenna 100*a* may be increased without increasing the length of the dielectric resonator antenna 100*a* in the first direction DR1 and the second direction DR2, so the antenna 100*a* may be installed in a narrow region.

Further, the efficiency of the dielectric resonator antenna 100*a* may be increased by additionally transmitting and receiving the electric signal by use of the antenna patch 31 positioned between the first dielectric material block 110 and the second dielectric material block 120, and the conductor loss caused by the antenna patch 31 may be reduced by disposing the antenna patch 31 to be near the bonding layer 130 with a relatively small relative dielectric constant.

On one plane formed where the first direction DR1 traverses the second direction DR2, the first feed via 11 and the second feed via 12 are disposed near the edge of the dielectric resonator antenna 100*a*. As described, by disposing the first feed via 11 and the second feed via 12 to be near the edge of the dielectric resonator antenna 100*a*, the electric signal is applied along the edge of the dielectric resonator antenna 100*a*, so the desired resonance frequency may be generated without increasing the size of the dielectric resonator antenna 100*a*.

The antenna patch 31 may include a first groove portion 311 formed in the edge disposed near the first feed pattern 21 and a second groove portion 312 formed in the edge disposed near the second feed pattern 22, and the planar shapes of the first groove portion 311 and the second groove portion 312 may correspond to the planar shapes of the edges of the first feed pattern 21 and the second feed pattern 22, respectively. As described, by forming the first groove portion 311 and the second groove portion 312 in the antenna patch 31, the first feed pattern 21, the second feed pattern 22, and the antenna patch 31 may be disposed to be spaced from each other without reducing the planar size of the dielectric resonator antenna 100*a* and the entire size of the antenna patch 31.

Many characteristics of the dielectric resonator antennas 100, 200, and 300 according to the embodiment are applicable to the dielectric resonator antenna 100*a* according to the present embodiment.

Figure 20:
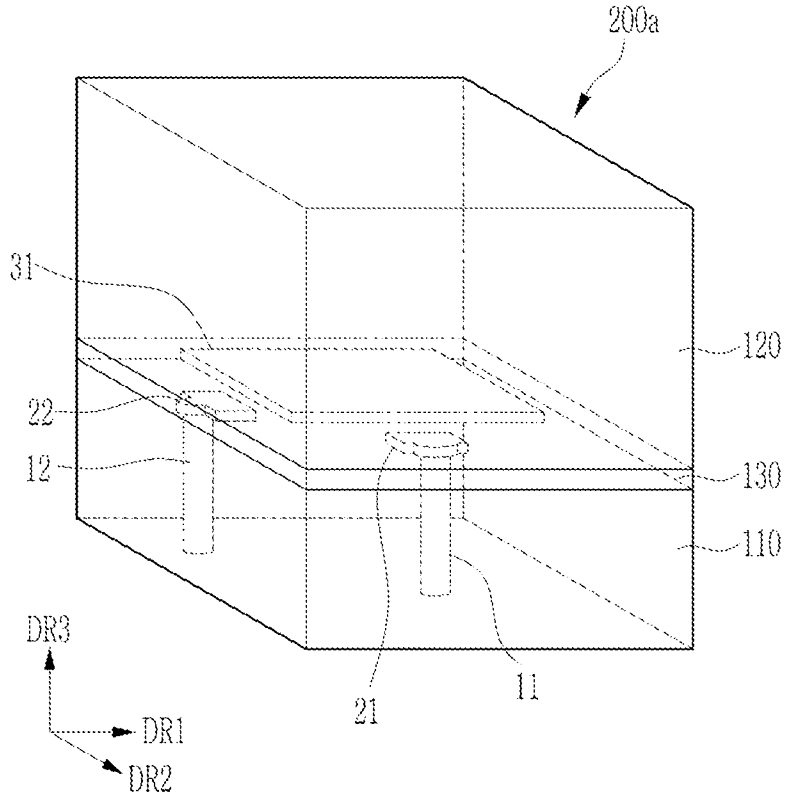
FIG. 20 shows a perspective view of a dielectric resonator antenna according to another embodiment.

A dielectric resonator antenna 200*a* according to another embodiment will now be described with reference to FIG. 20 and FIG. 21. FIG. 20 shows a perspective view of a dielectric resonator antenna according to another embodiment, and FIG. 21 shows a cross-sectional view of a dielectric resonator antenna shown in FIG. 20.

Figure 21:
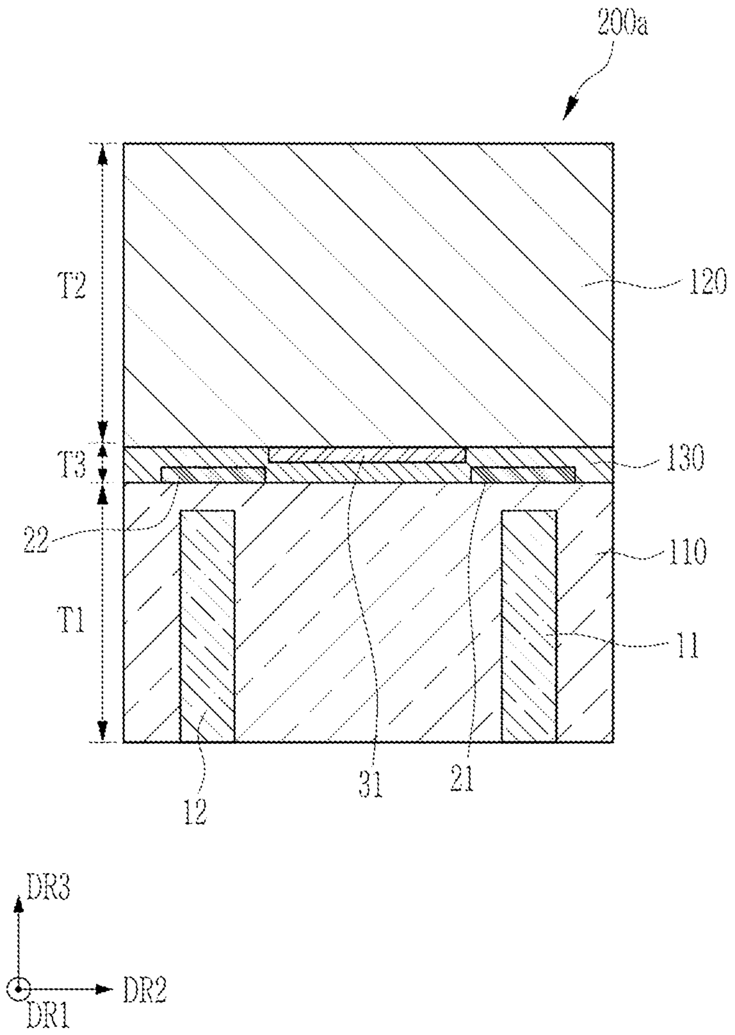
FIG. 21 shows a cross-sectional view of a dielectric resonator antenna shown in FIG. 20.

Referring to FIG. 20 and FIG. 21, the dielectric resonator antenna 200*a* according to the present embodiment is similar to the dielectric resonator antenna 100*a* according to an embodiment described with reference to FIG. 17 to FIG. 19. No detailed descriptions on the same constituent elements will be repeated.

The dielectric resonator antenna 200*a* according to the present embodiment includes: a first dielectric material block 110 and a second dielectric material block 120 stacked in the third direction DR3; a bonding layer 130 positioned between the first dielectric material block 110 and the second dielectric material block 120 and bonding the first dielectric material block 110 and the second dielectric material block 120; a first feed via 11 and a second feed via 12 positioned in the first dielectric material block 110; a first feed pattern 21 positioned between the first dielectric material block 110 and the second dielectric material block 120 and connected to the first feed via 11; a second feed pattern 22 connected to the second feed via 12; and an antenna patch 31 positioned between the first dielectric material block 110 and the second dielectric material block 120 and disposed to be spaced from the first feed pattern 21 and the second feed pattern 22. The antenna patch 31 is spaced from the first feed pattern 21 and the second feed pattern 22 and is coupled thereto, to thus receive the electric signal through the first feed via 11 and the first feed pattern 21 and/or through the second feed via 12 and the second feed pattern 22. The metal layer may not be positioned between the first feed pattern 21 and the second dielectric material block 120, and between the second feed pattern 22 and the second dielectric material block 120. No detailed descriptions on the same constituent elements as the dielectric resonator antenna 100*a* according to an embodiment described with reference to FIG. 17 to FIG. 19 will be repeated.

According to the dielectric resonator antenna 200*a* according to the present embodiment, differing from the dielectric resonator antenna 100*a* according to an embodiment described with reference to FIG. 17 to FIG. 19, in the third direction DR3, the first feed pattern 21, and the second feed pattern 22 may be positioned between the first dielectric material block 110 and the bonding layer 130, and the antenna patch 31 may be positioned between the bonding layer 130 and the second dielectric material block 120.

A portion of the first feed pattern 21 and a portion of the second feed pattern 22 may overlap the antenna patch 31 in the third direction DR3. By this, by not increasing the size of the dielectric resonator antenna 200*a* in the first direction DR1 and the second direction DR2, the size of the antenna patch 31 may be increased while the first feed pattern 21, the second feed pattern 22, and the antenna patch 31 are capacitive-coupled.

A remaining portion of the first feed pattern 21 and a remaining portion of the second feed pattern 22 do not overlap the antenna patch 31 in the third direction DR3, so not the metal layer but the bonding layer 130 may be positioned between the remaining portion of the first feed pattern 21, the remaining portion of the second feed pattern 22, and the second dielectric material block 120. By this, the electric signal transmitted through the first feed via 11, the first feed pattern 21, the second feed via 12, and the second feed pattern 22 may be transmitted to the second dielectric material block 120 without interference of the metal layer, and the second dielectric material block 120 may generate a resonance frequency.

Many characteristics of the above-described dielectric resonator antennas 100, 200, 300, and 100*a* according to an embodiment are applicable to the dielectric resonator antenna 200*a* according to the present embodiment.

Figure 22:
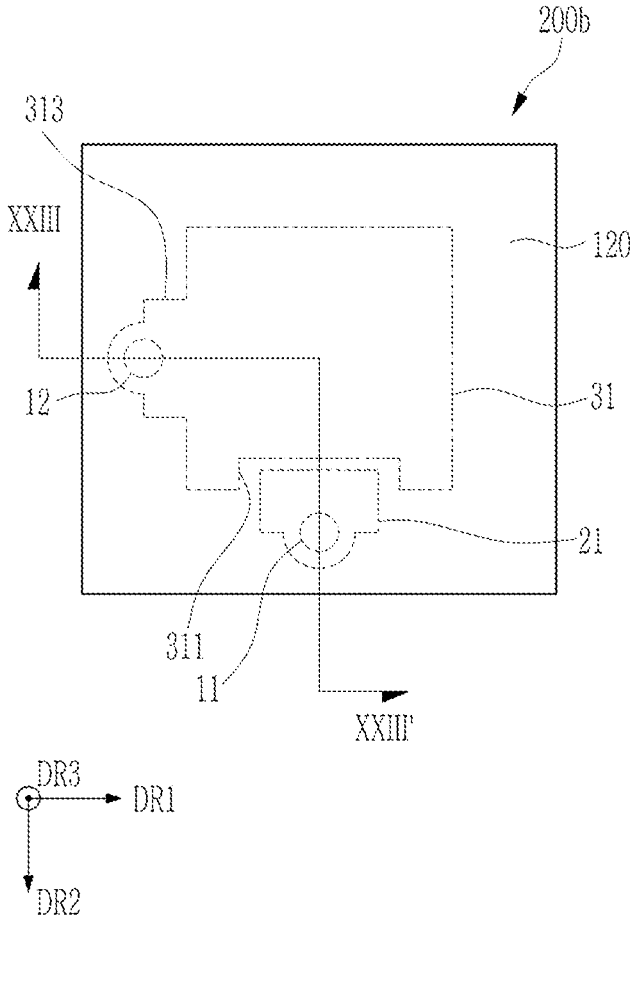
FIG. 22 shows a perspective view of a dielectric resonator antenna according to another embodiment.

A dielectric resonator antenna 200*b* according to another embodiment will now be described with reference to FIG. 22 and FIG. 23. FIG. 22 shows a perspective view of a dielectric resonator antenna according to another embodiment, and FIG. 23 shows a cross-sectional view of a dielectric resonator antenna shown in FIG. 22.

Figure 23:
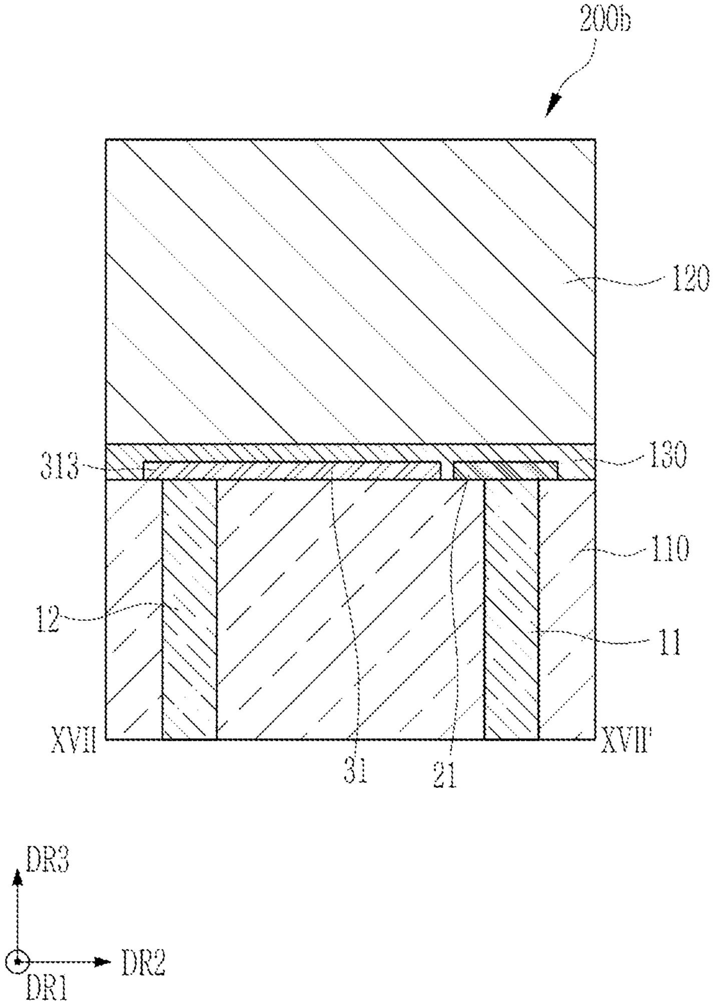
FIG. 23 shows a cross-sectional view of a dielectric resonator antenna shown in FIG. 22.

Referring to FIG. 22 and FIG. 23, the dielectric resonator antenna 200*b* according to the present embodiment is similar to the dielectric resonator antenna 100*a* according to an embodiment described with reference to FIG. 17 to FIG. 19. No detailed descriptions on the same constituent elements will be repeated.

The dielectric resonator antenna 200*b* according to the present embodiment includes: a first dielectric material block 110 and a second dielectric material block 120 stacked in the third direction DR3; a bonding layer 130 positioned between the first dielectric material block 110 and the second dielectric material block 120 and bonding the first dielectric material block 110 and the second dielectric material block 120; a first feed via 11 and a second feed via 12 positioned in the first dielectric material block 110; a first feed pattern 21 positioned between the first dielectric material block 110 and the second dielectric material block 120 and connected to the first feed via 11; and an antenna patch 31 positioned between the first dielectric material block 110 and the second dielectric material block 120 and disposed to be spaced from the first feed pattern 21. No detailed descriptions on the same constituent elements as the antenna 100*a* according to an embodiment described with reference to FIG. 17 to FIG. 19 will be repeated.

According to the antenna 200*b* according to the present embodiment, differing from the antenna 100*a* according to an embodiment described with reference to FIG. 17 to FIG. 19, the antenna patch 31 is positioned on the second feed via 12, and an expansion 313 of the antenna patch 31 may be connected to the second feed via 12 and may receive an electric signal from the second feed via 12. The expansion 313 of the antenna patch 31 may be connected to the second feed via 12 like the second feed pattern 22, and may simultaneously expand from the antenna patch 31 and may be connected to the antenna patch 31.

The antenna patch 31 may be spaced from the first feed pattern 21 connected to the first feed via 11, may be coupled thereto, and may accordingly be fed.

As described, the antenna patch 31 is fed through the first feed via 11 by the capacitive coupled feeding method, and it may be fed through the second feed via 12 by a mixed feeding method that is fed by a direct feeding method.

Not the metal layer but the bonding layer 130 may be positioned between the second dielectric material block 120 and the first feed pattern 21. That is, the antenna patch 31 may not be positioned between the first feed pattern 21 and the second dielectric material block 120.

By this, the electric signal transmitted through the first feed via 11 and the first feed pattern 21 may be transmitted to the second dielectric material block 120 without interference of the metal layer, and the second dielectric material block 120 may generate a resonance frequency.

Many characteristics of the above-described dielectric resonator antennas 100, 200, 300, 100*a*, and 200*a* according to an embodiment are applicable to the dielectric resonator antenna 200*b* of the present embodiment.

Figure 24:
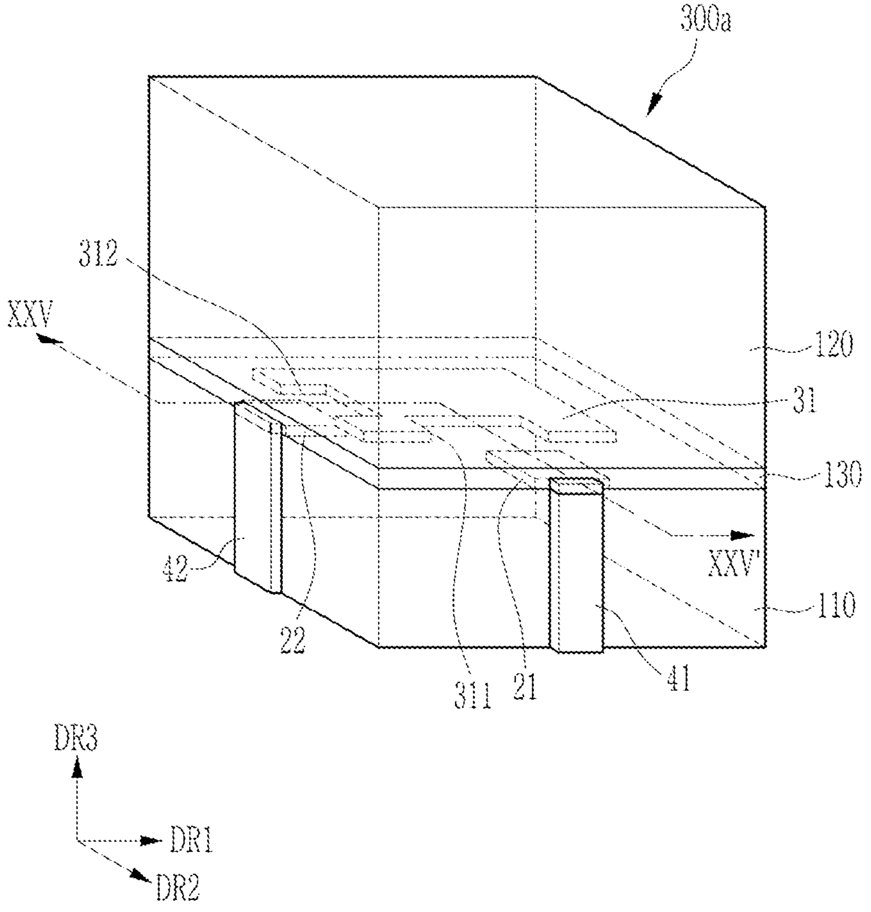
FIG. 24 shows a perspective view of a dielectric resonator antenna according to another embodiment.

A dielectric resonator antenna 300*a* according to another embodiment will now be described with reference to FIG. 24 and FIG. 25. FIG. 24 shows a perspective view of a dielectric resonator antenna according to another embodiment, and FIG. 25 shows a cross-sectional view of a dielectric resonator antenna shown in FIG. 24.

Figure 25:
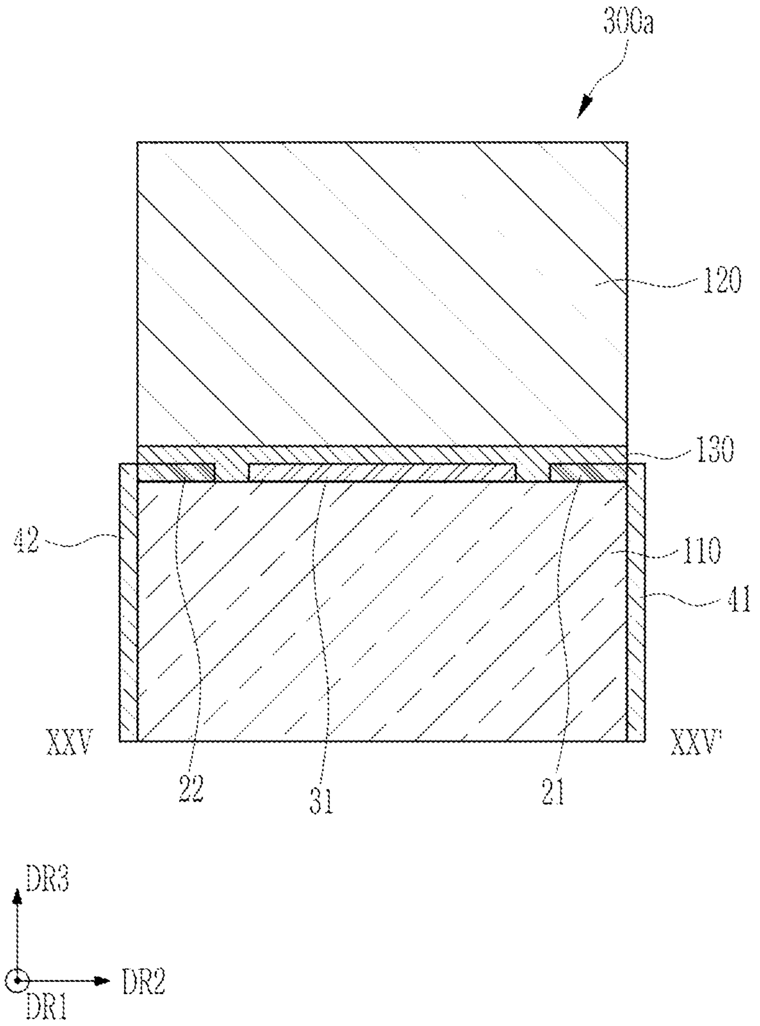
FIG. 25 shows a cross-sectional view of a dielectric resonator antenna shown in FIG. 24 with respect to a line XXV-XXV'.

Referring to FIG. 24 and FIG. 25, the dielectric resonator antenna 300*a* according to the present embodiment is similar to the dielectric resonator antenna 100*a* according to an embodiment described with reference to FIG. 17 to FIG. 19.

The antenna 300*a* includes: a first dielectric material block 110 and a second dielectric material block 120 stacked in the third direction DR3; a bonding layer 130 positioned between the first dielectric material block 110 and the second dielectric material block 120 and bonding the first dielectric material block 110 and the second dielectric material block 120; a first feed pattern 21 and a second feed pattern 22 positioned between the first dielectric material block 110 and the second dielectric material block 120; and an antenna patch 31 positioned between the first dielectric material block 110 and the second dielectric material block 120 and disposed to be spaced from the first feed pattern 21 and the second feed pattern 22. The metal layer may not be positioned between the first feed pattern 21, the second feed pattern 22, and the second dielectric material block 120. No detailed descriptions on the same constituent elements as the dielectric resonator antenna 100*a* according to an embodiment described with reference to FIG. 17 to FIG. 19 will be repeated.

Differing from the dielectric resonator antenna 100*a* according to an embodiment described with reference to FIG. 17 to FIG. 19, the dielectric resonator antenna 300*a* according to the present embodiment may include a first feed strip 41 and a second feed strip 42 positioned on a side of the first dielectric material block 110.

The first feed strip 41 may be connected to the first feed pattern 21 positioned on the first dielectric material block 110, and the second feed strip 42 connected to the second feed pattern 22 positioned on the first dielectric material block 110.

The first feed pattern 21 and the second feed pattern 22 may be disposed to be spaced from the antenna patch 31 on one plane formed where the first direction DR1 traverses the second direction DR2, and the first feed pattern 21, the second feed pattern 22, and the antenna patch 31 may be coupled to each other, so the antenna patch 31 may be fed through the first feed pattern 21 and the second feed pattern 22 by the capacitive coupled feeding method.

The first feed strip 41 may transmit a first polarization RF signal, and the second feed strip 42 may transmit a second polarization RF signal. For example, the first polarization may be horizontal polarization, and the second polarization may be perpendicular polarization.

The antenna patch 31 may include a first groove portion 311 formed in the edge disposed near the first feed strip 41 and a second groove portion 312 formed in the edge disposed near the second feed strip 42. However, according to another embodiment, the antenna patch 31 may not have the first and second groove portions 311 and 312.

The electric signal applied to the first feed strip 41 and the second feed strip 42 is transmitted to the first dielectric material block 110 and the second dielectric material block 120 to generate a resonance frequency, and is transmitted to the antenna patch 31 through the first feed pattern 21 and the second feed pattern 22 to additionally transmit and receive the electric signal, thereby increasing the efficiency of the dielectric resonator antenna 300*a*.

Many characteristics of the dielectric resonator antennas 100, 200, 300, 100*a*, 200*a*, and 200*b* according to an embodiment are applicable to the dielectric resonator antenna 300*a* according to the present embodiment.

Figure 26:
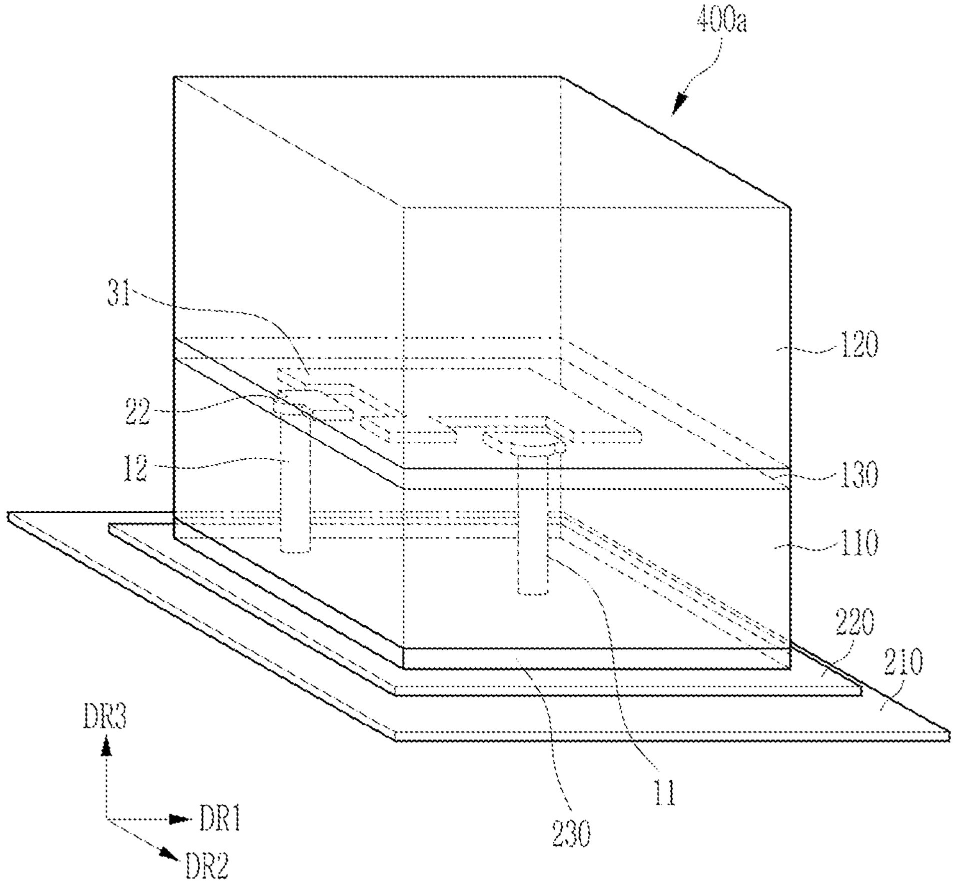
FIG. 26 shows a perspective view of a dielectric resonator antenna module according to an embodiment.
Figure 27:
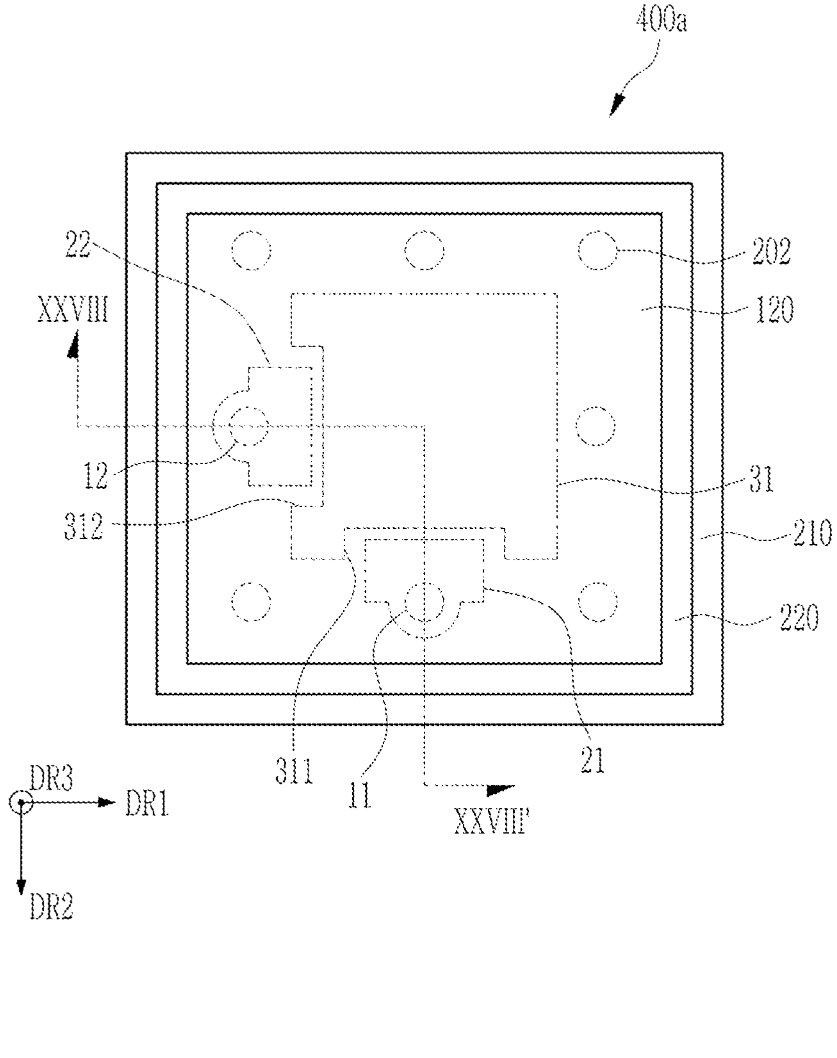
FIG. 27 shows a top plan view of a dielectric resonator antenna module of FIG. 26.
Figure 28:
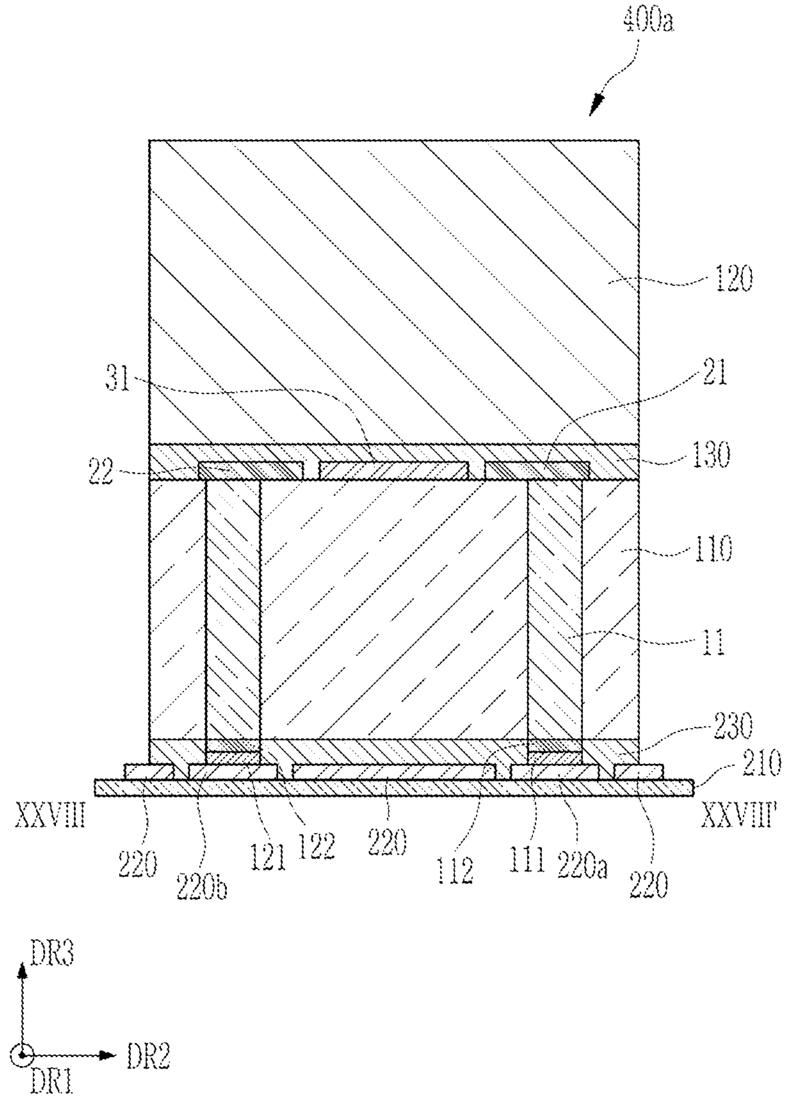
FIG. 28 shows a cross-sectional view with respect to a line XXVIII-XXVIII' of FIG. 27.

A dielectric resonator antenna module 400*a* according to another embodiment will now be described with reference to FIG. 26 to FIG. 28. FIG. 26 shows a perspective view of a dielectric resonator antenna module according to an embodiment, FIG. 27 shows a top plan view of a dielectric resonator antenna module of FIG. 26, and FIG. 28 shows a cross-sectional view with respect to a line XXVIII-XXVIII' of FIG. 27.

The dielectric resonator antenna module 400*a* may include a dielectric resonator antenna 100*a* positioned on the substrate 210. The dielectric resonator antenna 100*a* positioned on the substrate 210 is similar to the dielectric resonator antenna 100*a* according to an embodiment described with reference to FIG. 17 to FIG. 19.

The dielectric resonator antenna 100*a* includes: a first dielectric material block 110 and a second dielectric material block 120 stacked in the third direction DR3; a bonding layer 130 positioned between the first dielectric material block 110 and the second dielectric material block 120 and bonding the first dielectric material block 110 and the second dielectric material block 120; a first feed via 11 and a second feed via 12 positioned in the first dielectric material block 110; a first feed pattern 21 and a second feed pattern 22 positioned between the first dielectric material block 110 and the second dielectric material block 120 and connected to the first feed via 11 and the second feed via 12; and an antenna patch 31 position between the first dielectric material block 110 and the second dielectric material block 120 and disposed to be spaced from the first feed pattern 21 and the second feed pattern 22. The antenna patch 31 is spaced from the first feed pattern 21 and is coupled thereto, thus receiving the electric signal through the first feed via 11 and the first feed pattern 21. The antenna patch 31 is spaced from the second feed pattern 22 and is coupled thereto, thus the antenna patch 31 may receive the electric signal through the second feed via 12 and the second feed pattern 22. The metal layer may not be positioned between the first feed pattern 21, the second feed pattern 22, and the second dielectric material block 120. No detailed descriptions on the same constituent elements as the dielectric resonator antenna 100*a* according to an embodiment described with reference to FIG. 17 to FIG. 19 will be repeated.

A ground electrode 220 and feed wires 220*a* and 220*b* may be positioned on the substrate 210, and the ground electrode 220 and the feed wires 220*a* and 220*b* may be disposed to be spaced from each other in an insulated way. That is, the feed wires 220*a* and 220*b* for supplying an electric signal to the dielectric resonator antenna may be disposed to be positioned on the substrate 210 and expand the ground electrode 220 to be around the edge of the substrate 210 from peripheral portions of the feed wires 220*a* and 220*b*.

The first feed via 11 penetrating through the first dielectric material block 110 is connected to the feed wire 220*a* through the solder ball 111 and the first contact pad 112, and the second feed via 12 is connected to the feed wire 220*b* through the solder ball 121 and the second contact pad 122, so the first feed via 11 and the second feed via 12 may be electrically connected to the substrate 210.

A plurality of dummy pad units 202 may be positioned between the substrate 210 and the first dielectric material block 110.

The dummy pad units 202 are positioned on a portion in which the first feed via 11 and the second feed via 12 are not positioned so that a gap between the substrate 210 and the first dielectric material block 110 may be maintained on the portion in which the first feed via 11 and the second feed via 12 are not positioned, and the dummy pad units 202 are connected to the ground electrode 220 of the substrate 210 through a dummy solder ball (not shown) so the first dielectric material block 110 may be attached to the substrate 210.

The dummy pad units 202 may be uniformly disposed so that they may be at regular intervals in the first direction DR1 and the second direction DR2 along the edge of the first dielectric material block 110 together with the first contact pad 112 and the second contact pad 122, and hence, the distribution of the electric signal applied to the dummy pad units 202, the first contact pad 112, and the second contact pad 122 positioned below the first dielectric material block 110 may also be uniform. Therefore, the electric signal of the dielectric resonator antenna module 400*a* may be prevented from being distorted depending on the position on a combined portion of the substrate 210 and the dielectric resonator antenna 100*a*.

An underfill material 230 may be positioned between the substrate 210 and the first dielectric material block 110. The underfill material 230 may be formed to wrap the portion in which the first contact pad 112, the second contact pad 122, and the plurality of dummy pad units 202 are connected to the feed wires 220*a* and 220*b* and the ground electrode 220 through the solder balls 111 and 121 and the dummy solder ball, thereby supporting the first dielectric material block 110 to be firmly fixed to the substrate 210, and it may fill the space between the first dielectric material block 110 and the substrate 210 to prevent external dust or moisture from permeating and breaking insulation or erroneous operation of the insulation at the access unit.

The dielectric resonator antenna module 400*a* according to the present embodiment has been described to include the dielectric resonator antenna 100*a* according to an embodiment described with reference to FIG. 17 to FIG. 19, and without being limited thereto, the antenna module according to another embodiment may include one of the above-described dielectric resonator antennas 100*a*, 200*a*, 200*b*, and 300*a*. Many characteristics of the dielectric resonator antennas 100*a*, 200*a*, 200*b*, and 300*a* are applicable to the dielectric resonator antenna module 400*a* according to the present embodiment.

Figure 29:
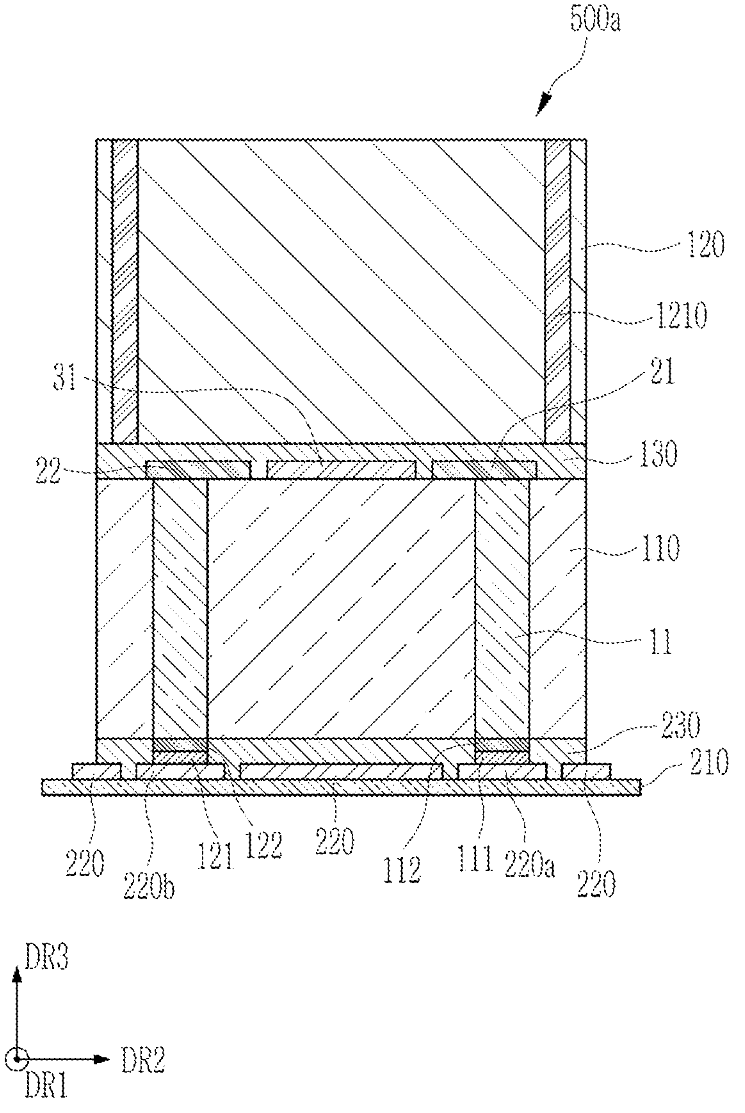
FIG. 29 shows a cross-sectional view of a dielectric resonator antenna module according to another embodiment.

A dielectric resonator antenna module 500*a* according to another embodiment will now be described with reference to FIG. 29 and FIG. 30. FIG. 29 shows a cross-sectional view of a dielectric resonator antenna module according to another embodiment, and FIG. 30 shows a top plan view of a dielectric resonator antenna module of FIG. 29.

Figure 30:
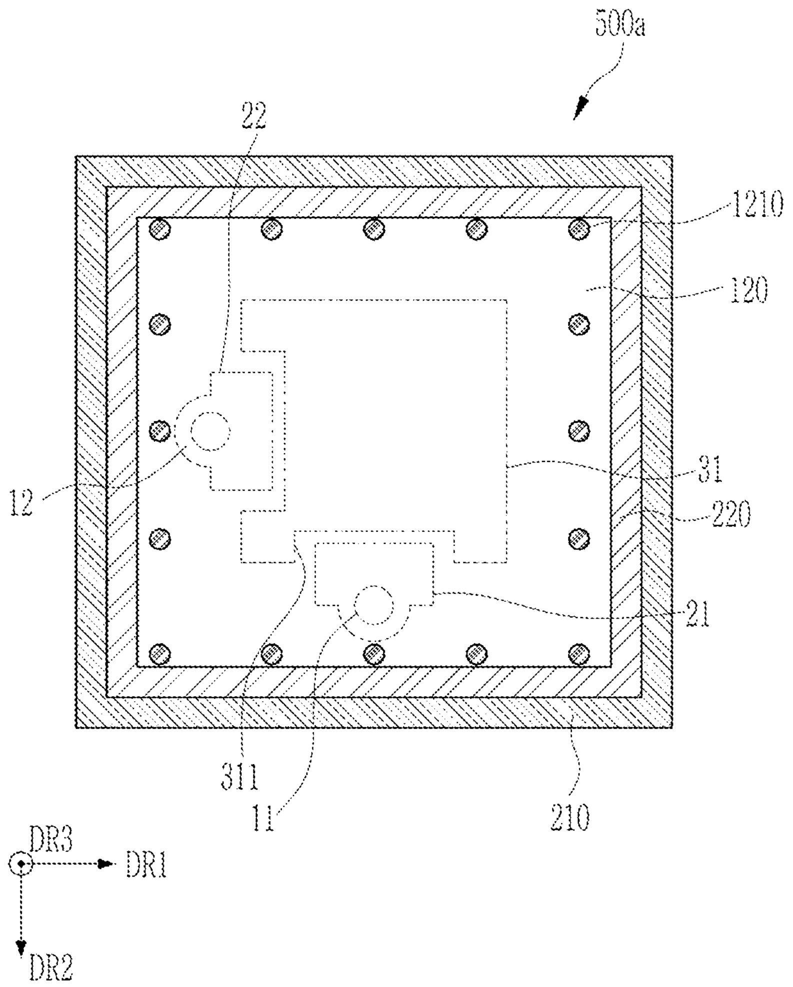
FIG. 30 shows a top plan view of a dielectric resonator antenna module of FIG. 29.

Referring to FIG. 29 and FIG. 30, the dielectric resonator antenna module 500*a* according to the present embodiment is similar to the dielectric resonator antenna module 400*a* according to an embodiment described with reference to FIG. 26 to FIG. 28. No same constituent elements will be described in detail.

According to the dielectric resonator antenna module 500*a* according to the present embodiment, differing from the dielectric resonator antenna module 400*a* according to an embodiment described with reference to FIG. 26 to FIG. 28, a plurality of shield vias 1210 may be positioned along the edge on one plane formed where the first direction DR1 of the second dielectric material block 120 traverses the second direction DR2. That is, the plurality of shield vias 1210 may be arranged with gaps among them near inner sides of four respective edges of the second dielectric material block 120 in a substantially rectangular or square planar shape to thus form a via wall. A plurality of shield vias 1210 may penetrate through the second dielectric material block 120.

By forming the plurality of shield vias 1210 on the second dielectric material block 120, the loss of electrical energy and the change of propagation pattern generated when the relative dielectric constant and the thickness of the second dielectric material block 120 are increased may be prevented.

The dielectric resonator antenna module 500*a* according to the present embodiment has been described to include the dielectric resonator antenna 100*a* according to an embodiment described with reference to FIG. 17 to FIG. 19, and without being limited thereto, the dielectric resonator antenna module according to another embodiment may include one of the above-described dielectric resonator antennas 100*a*, 200*a*, 200*b*, and 300*a*. Many characteristics of the dielectric resonator antennas 100*a*, 200*a*, 200*b*, and 300*a* are applicable to the dielectric resonator antenna module 500*a* according to the present embodiment.

Figure 31:
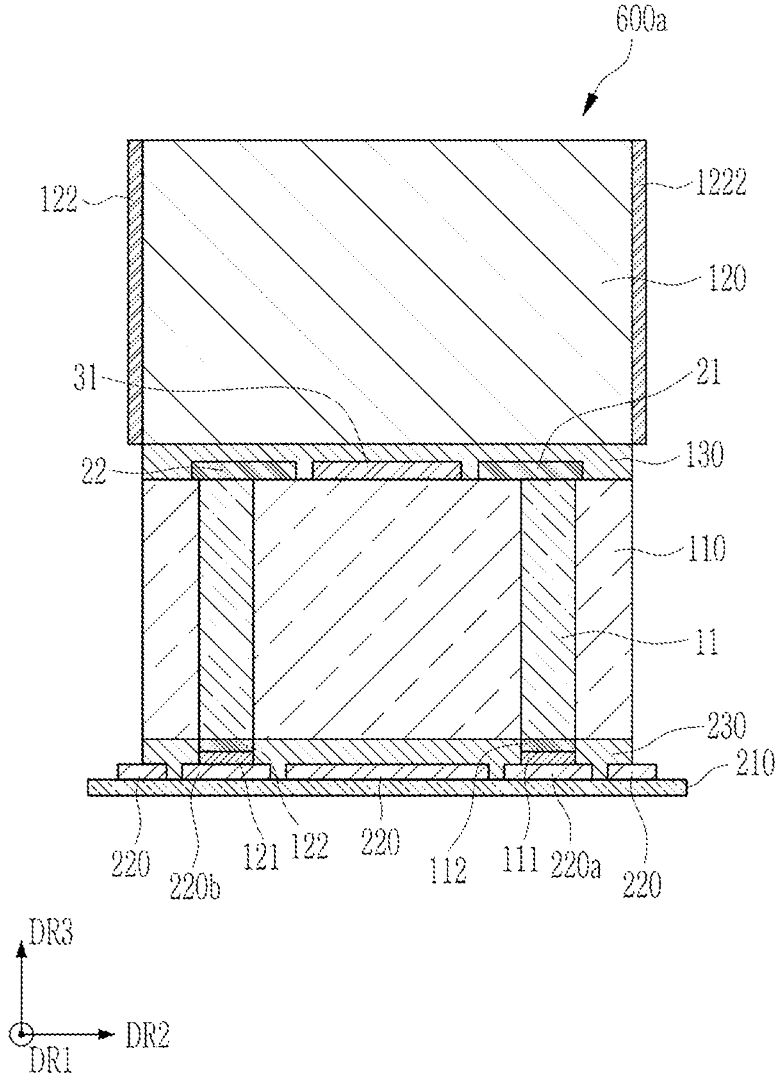
FIG. 31 shows a cross-sectional view of a dielectric resonator antenna module according to another embodiment.

A dielectric resonator antenna module 600*a* according to another embodiment will now be described with reference to FIG. 31 and FIG. 32. FIG. 31 shows a cross-sectional view of a dielectric resonator antenna module according to another embodiment, and FIG. 32 shows a top plan view of a dielectric resonator antenna module of FIG. 31.

Figure 32:
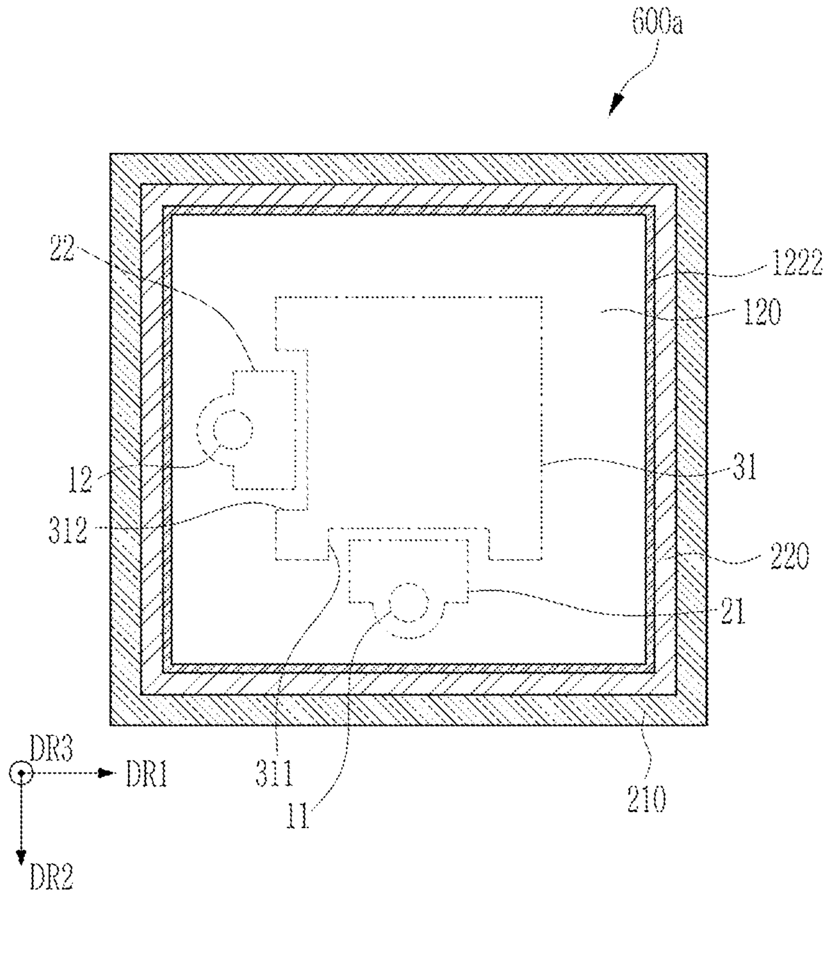
FIG. 32 shows a top plan view of a dielectric resonator antenna module of FIG. 31.

Referring to FIG. 31 and FIG. 32, the dielectric resonator antenna module 600*a* according to the present embodiment is similar to the dielectric resonator antenna module 400*a* according to an embodiment described with reference to FIG. 26 to FIG. 28. No same constituent elements will be described in further detail.

According to the dielectric resonator antenna module 600*a* according to the present embodiment, differing from the dielectric resonator antenna module 400*a* according to an embodiment described with reference to FIG. 26 to FIG. 28, a metallic wall 1222 may be positioned on an external surface along the circumference of the second dielectric material block 120. That is, a metallic wall 1222 may be formed along the external lateral surface of the four respective edges of the second dielectric material block 120 in a rectangular shape or a square planar shape. The metallic wall 1222 may be formed to surround the second dielectric material block 120 on a plane formed where the first direction DR1 traverses the second direction DR2, and the metallic wall 1222 may extend to an upper side from a lower side of the second dielectric material block 120 in the third direction DR3.

By forming the metallic wall 1222 on the outside of the second dielectric material block 120, the loss of electrical energy and the change of the propagation pattern generated when the relative dielectric constant and the thickness of the second dielectric material block 120 are increased may be mitigated.

The dielectric resonator antenna module 600*a* according to the present embodiment has been described to include the dielectric resonator antenna 100*a* according to an embodiment described with reference to FIG. 17 to FIG. 19, and without being limited thereto, the antenna module according to another embodiment may include one of the above-described dielectric resonator antennas 100*a*, 200*a*, 200*b*, and 300*a*. Many characteristics of the dielectric resonator antennas 100*a*, 200*a*, 200*b*, and 300*a* are applicable to the dielectric resonator antenna module 600*a* according to the present embodiment.

Figure 33:
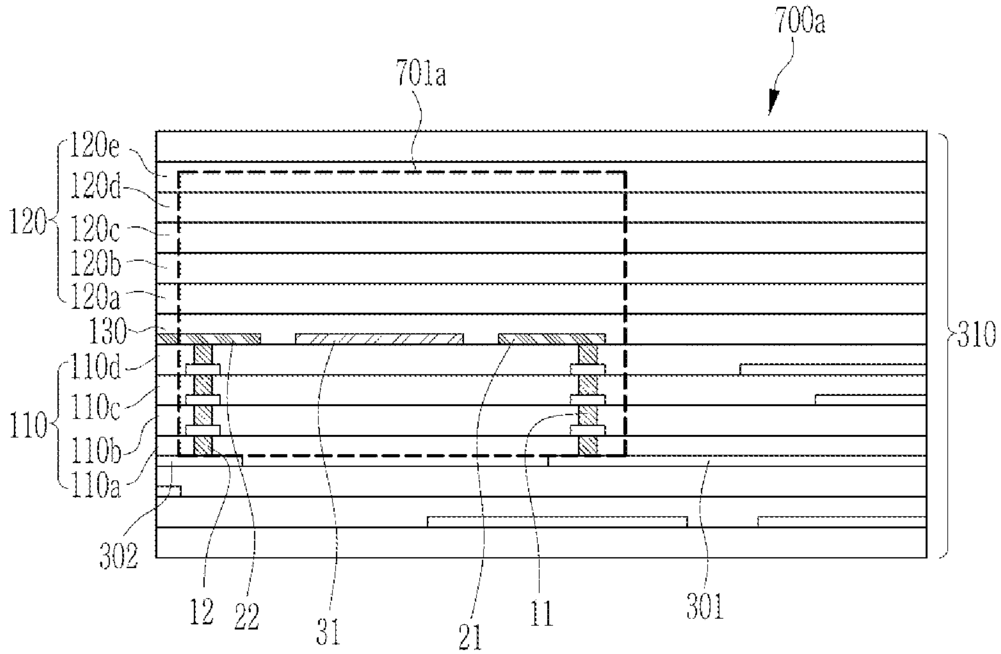
FIG. 33 shows a cross-sectional view of a dielectric resonator antenna module according to another embodiment.

A dielectric resonator antenna module 700*a* according to another embodiment will now be described with reference to FIG. 33. FIG. 33 shows a cross-sectional view of a dielectric resonator antenna module according to another embodiment.

Referring to FIG. 33, the dielectric resonator antenna module 700*a* according to the present embodiment includes a dielectric resonator antenna 701*a* installed in the substrate 310 configuring the printed circuit board (PCB).

The dielectric resonator antenna 701*a* may include: a first dielectric material block 110; a second dielectric material block 120 positioned on the first dielectric material block 110; a bonding layer 130 positioned between the first dielectric material block 110 and the second dielectric material block 120; a first feed via 11 and a second feed via 12 for penetrating through the first dielectric material block 110; a first feed pattern 21 positioned between the first dielectric material block 110 and the second dielectric material block 120 and connected to the first feed via 11; a second feed pattern 22 connected to the second feed via 12; and an antenna patch 31 positioned between the first dielectric material block 110 and the second dielectric material block 120 and disposed to be spaced from the first feed pattern 21 and the second feed pattern 22.

The first dielectric material block 110 may include a plurality of first dielectric layers 110*a*, 110*b*, 110*c*, and 110*d*, and the second dielectric material block 120 may include a plurality of dielectric layers 120*a*, 120*b*, 120*c*, 120*d*, and 120*e*.

Metal wires 301 and 302 for applying RF signals may be positioned in the substrate 310, and a first feed via 11 and a second feed via 12 may be positioned in the first dielectric material block 110 positioned on the metal wires 301 and 302. The first feed via 11 may be connected to the metal wire 301 and the second feed via 12 may be connected to the metal wire 302, so the first feed via 11 and the second feed via 12 may receive electric signals from the metal wires 301 and 302.

No other metal layers but the first feed via 11 and the second feed via 12 may be positioned among the plurality of first dielectric layers 110*a*, 110*b*, 110*c*, and 110*d* included by the first dielectric material block 110.

A first feed pattern 21 connected to the first feed via 11, a second feed pattern 22 connected to the second feed via 12, and an antenna patch 31 disposed to be spaced from the first feed pattern 21 and the second feed pattern 22 and coupled to the first feed pattern 21 and the second feed pattern 22 may be positioned on the first dielectric material block 110.

The first feed pattern 21, the second feed pattern 22, and the antenna patch 31 may be disposed on a same layer to be spaced from each other in the first direction DR1. However, in a similar way to the dielectric resonator antenna 200*a* according to an embodiment described with reference to FIG. 20 and FIG. 21, the first feed pattern 21, the second feed pattern 22, and the antenna patch 31 may be positioned on different layers to be spaced from each other in the third direction DR3. In detail, in a similar way to the dielectric resonator antenna 200*a* according to an embodiment described with reference to FIG. 20 and FIG. 21, the first feed pattern 21 and the second feed pattern 22 may be positioned between the first dielectric material block 110 and the bonding layer 130, and the antenna patch 31 may be positioned between the bonding layer 130 and the second dielectric material block 120. As described, the first feed pattern 21 and the second feed pattern 22 may be disposed to be spaced from the antenna patch 31, and the antenna patch 31 may be coupled to the first feed pattern 21 and the second feed pattern 22, so the antenna patch 31 may be fed through the first feed pattern 21 and the second feed pattern 22 by the capacitive coupled feeding method.

A bonding layer 130 is positioned on the first feed pattern 21, the second feed pattern 22, and the antenna patch 31. The bonding layer 130 may be a single-layer dielectric layer, it may include a multilayered dielectric layer, the bonding layer 130 may be one of the plurality of first dielectric layers 110*a*, 110*b*, 110*c*, and 110*d*, and may be one of the plurality of dielectric layers 120*a*, 120*b*, 120*c*, 120*d*, and 120*e*.

A second dielectric material block 120 may be positioned on the bonding layer 130. The metal layer may not be positioned between the first feed pattern 21 and the second dielectric material block 120, and between the second feed pattern 22 and the second dielectric material block 120, so that the electric signal applied to the first feed pattern 21 and the second feed pattern 22 may be well transmitted to the second dielectric material block 120.

When the electric signal is applied to the first feed via 11 and the second feed via 12, resonance with a predetermined frequency may be generated in the first dielectric material block 110 including the plurality of first dielectric layers 110*a*, 110*b*, 110*c*, and 110*d* and the second dielectric material block 120 including the plurality of dielectric layers 120*a*, 120*b*, 120*c*, 120*d*, and 120*e*, the RF signal may be transmitted and received according to the resonance frequency, and the efficiency of the dielectric resonator antenna 701*a* may be increased by additionally transmitting and receiving the electric signal by use of the antenna patch 31 positioned between the first dielectric material block 110 and the second dielectric material block 120.

Many characteristics of the dielectric resonator antennas 100*a*, 200*a*, 200*b*, and 300*a* are applicable to the dielectric resonator antenna 701*a* of the dielectric resonator antenna module 700*a* according to the present embodiment.

Figure 34:
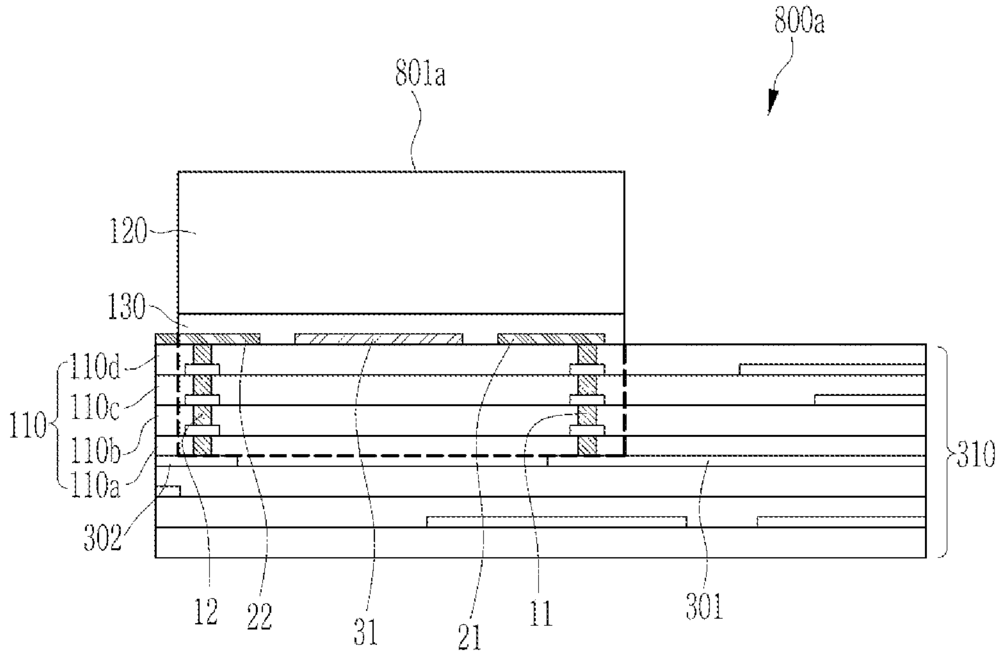
FIG. 34 shows a cross-sectional view of a dielectric resonator antenna module according to another embodiment.

A dielectric resonator antenna module 800*a* according to another embodiment will now be described with reference to FIG. 34. FIG. 34 shows a cross-sectional view of a dielectric resonator antenna module according to another embodiment.

Referring to FIG. 34, the dielectric resonator antenna module 800*a* according to the present embodiment includes a dielectric resonator antenna 801*a*, and the dielectric resonator antenna 801*a* includes: a first dielectric material block 110 including a plurality of first dielectric layers 110*a*, 110*b*, 110*c*, and 110*d* of a substrate 310 configuring a printed circuit board (PCB); a first feed via 11 and a second feed via 12 penetrating through the first dielectric material block 110; a first feed pattern 21, a second feed pattern 22, and an antenna patch 31 positioned on the substrate 310; a second dielectric material block 120 positioned on the first feed pattern 21, the second feed pattern 22, and the antenna patch 31; and a bonding layer 130 positioned between the first dielectric material block 110 and the second dielectric material block 120.

The metal wires 301 and 302 for applying RF signals are positioned in the substrate 310, and the first feed via 11 and the second feed via 12 are positioned in the first dielectric material block 110 positioned on the metal wires 301 and 302. The first feed via 11 is connected to the metal wire 301 and the second feed via 12 is connected to the metal wire 302, so the first feed via 11 and the second feed via 12 may receive electric signals from the metal wires 301 and 302.

No other metal layers but the first feed via 11 and the second feed via 12 may be positioned among the plurality of first dielectric layers 110*a*, 110*b*, 110*c*, and 110*d* included by the first dielectric material block 110.

The first feed pattern 21 connected to the first feed via 11, the second feed pattern 22 connected to the second feed via 12, and the antenna patch 31 spaced from the first and second feed patterns 21 and 22 and coupled to the first and second feed patterns 21 and 22 may be positioned on the first dielectric material block 110.

The first feed pattern 21, the second feed pattern 22, and the antenna patch 31 may be disposed on the same layer to be spaced from each other in the first direction DR1. However, in a similar way to the dielectric resonator antenna 200*a* according to an embodiment described with reference to FIG. 20 and FIG. 21, the first feed pattern 21, the second feed pattern 22, and the antenna patch 31 may be positioned on the different layers so as to be spaced from each other in the third direction DR3. As described, the first feed pattern 21 and the second feed pattern 22 may be disposed to be spaced from the antenna patch 31, and the first feed pattern 21, the second feed pattern 22, and the antenna patch 31 may be coupled to each other, so the antenna patch 31 may be fed through the first feed pattern 21 and the second feed pattern 22 according to the capacitive coupled feeding method.

A bonding layer 130 is positioned on the first feed pattern 21, the second feed pattern 22, and the antenna patch 31. However, in a similar way to the dielectric resonator antenna 200*a* according to an embodiment described with reference to FIG. 20 and FIG. 21, the bonding layer 130 may be positioned on the first feed pattern 21 and the second feed pattern 22, and the antenna patch 31 may be positioned on the bonding layer 130.

A second dielectric material block 120 is positioned on the bonding layer 130. No metal layer may be positioned between the first feed pattern 21 and the second dielectric material block 120, and the second feed pattern 22 and the second dielectric material block 120, and by this, the electric signal applied to the first feed pattern 21 and the second feed pattern 22 may be well transmitted to the second dielectric material block 120.

Differing from the first dielectric material block 110 including the plurality of first dielectric layers 110*a*, 110*b*, 110*c*, and 110*d* configuring the substrate 310, the bonding layer 130 and the second dielectric material block 120 are individual layers positioned on the substrate 310, and they may be respectively made of one dielectric layer.

When electric signals are applied to the first feed via 11 and the second feed via 12, resonance with a predetermined frequency is generated in the first dielectric material block 110 including the plurality of first dielectric layers 110*a*, 110*b*, 110*c*, and 110*d* and the second dielectric material block 120, an RF signal may be transmitted and received according to the resonance frequency, and the efficiency of the dielectric resonator antenna 801*a* may be increased by additionally transmitting and receiving the electric signal by use of the antenna patch 31 positioned between the first dielectric material block 110 and the second dielectric material block 120.

Many characteristics of the dielectric resonator antennas 100*a*, 200*a*, 200*b*, and 300*a* are applicable to the dielectric resonator antenna 801*a* of the dielectric resonator antenna module 800*a* according to the present embodiment.

Figure 35:
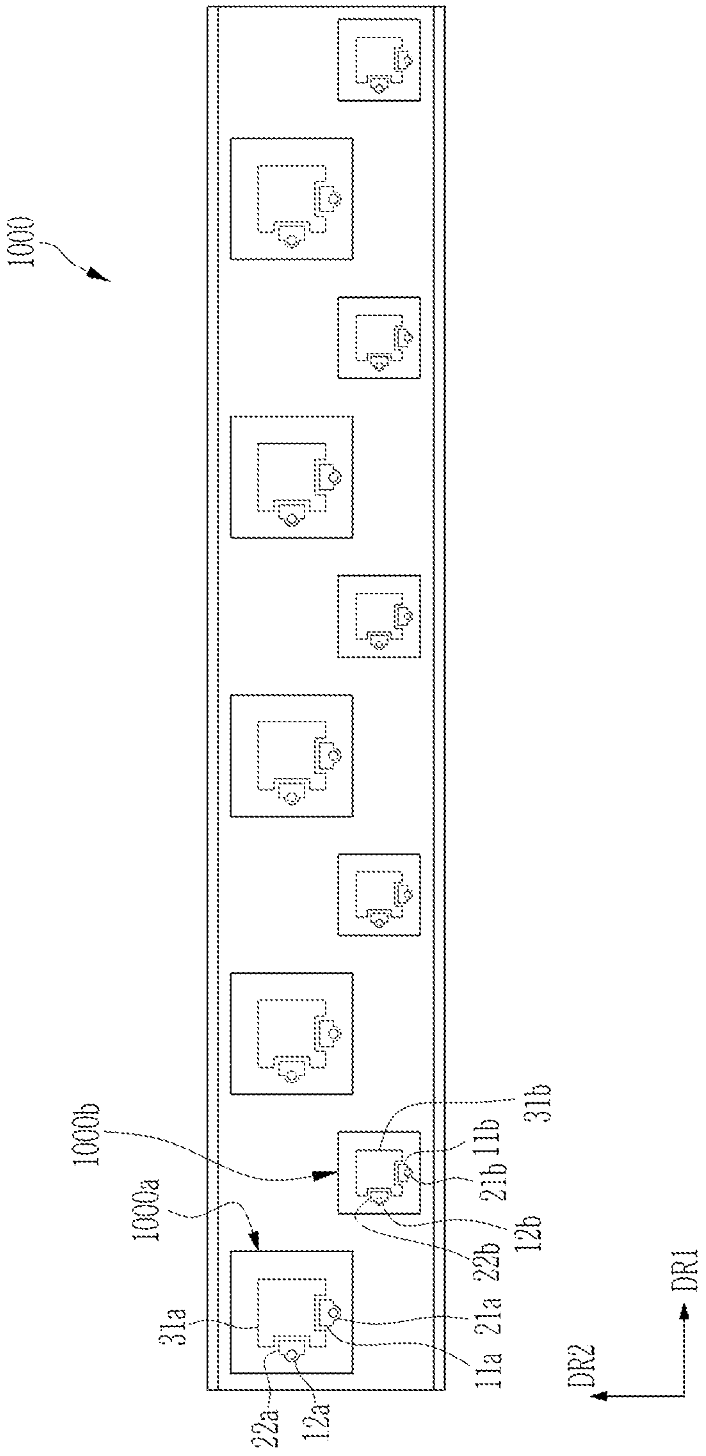
FIG. 35 shows a top plan view of an arrangement of a plurality of dielectric resonator antennas according to an embodiment.

A dielectric resonator antenna device 1000 according to an embodiment will now be described with reference to FIG. 35. FIG. 35 shows a top plan view of an arrangement of a plurality of dielectric resonator antennas according to an embodiment.

Referring to FIG. 35, the antenna device 1000 according to the present embodiment includes a plurality of first dielectric resonator antennas 1000*a* and a plurality of second dielectric resonator antennas 1000*b* alternately disposed in the first direction DR1. The first dielectric resonator antennas 1000*a* and the second dielectric resonator antennas 1000*b* may make pairs and may be disposed as pairs in the first direction DR1.

A plurality of first dielectric resonator antennas 1000*a* and a plurality of second dielectric resonator antennas 1000*b* may not be disposed on the same position in the second direction DR2, and by this, the first dielectric resonator antennas 1000*a* and the second dielectric resonator antennas 1000*b* may be sequentially disposed in an alternate way in the second direction DR2 along the first direction DR1. As described, by not disposing the plurality of first dielectric resonator antennas 1000*a* and the plurality of second dielectric resonator antennas 1000*b* in a row, interference between the adjacent first dielectric resonator antenna 1000*a* and the second dielectric resonator antenna 1000*b* may be reduced.

The first dielectric resonator antennas 1000*a* and the second dielectric resonator antennas 1000*b* may have the same structure as at least one structure of the dielectric resonator antennas 100, 200, 300, 100*a*, 200*a*, 200*b*, and 300*a* according to the above-described embodiments.

For example, the plurality of first dielectric resonator antennas 1000*a* may include: a first dielectric material block 110 and a second dielectric material block 120 that are stacked; a bonding layer 130 positioned between the first dielectric material block 110 and the second dielectric material block 120 and bonding the first dielectric material block 110 and the second dielectric material block 120; feed vias 11*a* and 12*a* positioned in the first dielectric material block 110; feed patterns 21*a* and 22*a* positioned between the first dielectric material block 110 and the second dielectric material block 120 and connected to the feed vias 11*a* and 12*a*; and an antenna patch 31*a* positioned between the first dielectric material block 110 and the second dielectric material block 120 and spaced from the feed patterns 21*a* and 22*a* and coupled to the same.

For example, the plurality of second dielectric resonator antennas 1000*b* may include: a first dielectric material block 110 and a second dielectric material block 120 that are stacked; a bonding layer 130 positioned between the first dielectric material block 110 and the second dielectric material block 120 and bonding the first dielectric material block 110 and the second dielectric material block 120; feed vias 11*b* and 12*b* positioned in the first dielectric material block 110; feed patterns 21*b* and 22*b* positioned between the first dielectric material block 110 and the second dielectric material block 120 and connected to the feed vias 11*b*, and 12*b*; and an antenna patch 31*b* positioned between the first dielectric material block 110 and the second dielectric material block 120, spaced from the feed patterns 21*b* and 22*b*, and coupled to the same.

The plurality of first dielectric resonator antennas 1000*a* may transmit and receive first RF signals, and the plurality of second dielectric resonator antennas 1000*b* may transmit and receive second RF signals. The first RF signal may be a signal in a first frequency band, the second RF signal may be a signal in a second frequency band, and for example, the first frequency band may be about 24.25 GHz to about 29.5 GHz, and a center frequency of the first frequency band may be about 28 GHz. The second frequency band may be about 37 GHz to about 40 GHz, and the center frequency of the second frequency band may be about 39 GHz.

Figure 36:
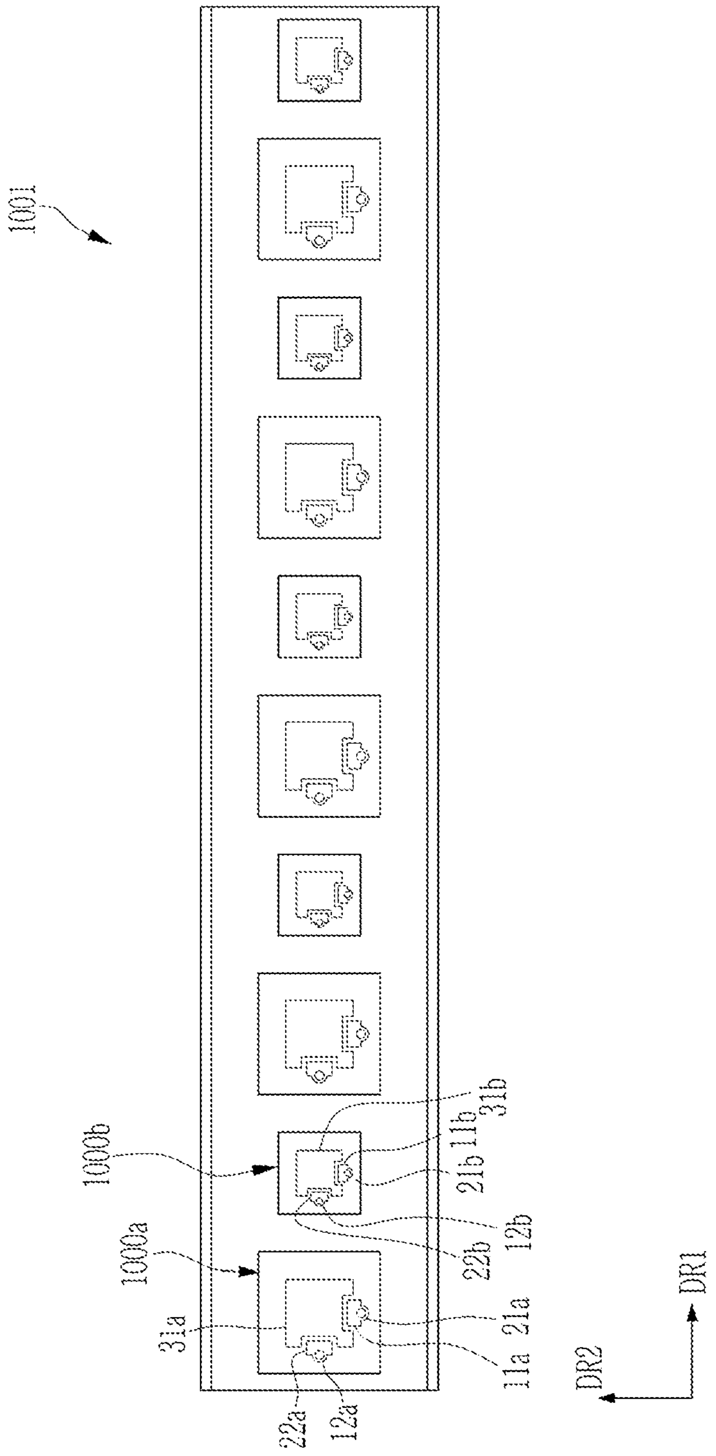
FIG. 36 shows a top plan view of an arrangement of a plurality of dielectric resonator antennas according to another embodiment.

A dielectric resonator antenna device 1001 according to an embodiment will now be described with reference to FIG. 36. FIG. 36 shows a top plan view of an arrangement of a plurality of dielectric resonator antennas according to another embodiment.

Referring to FIG. 36, the antenna device 1001 according to the present embodiment includes a plurality of first dielectric resonator antennas 1000*a* and a plurality of second dielectric resonator antennas 1000*b* alternately disposed in the first direction DR1. The first dielectric resonator antenna 1000*a* and the second dielectric resonator antenna 1000*b* may make pairs and may be disposed as pairs in the first direction DR1, and differing from the dielectric resonator antenna device 1000 according to an embodiment described with reference to FIG. 35, the plurality of first dielectric resonator antennas 1000*a* and the plurality of second dielectric resonator antennas 1000*b* may be disposed in a row in the first direction DR1. As described, by disposing the plurality of first dielectric resonator antennas 1000*a* and the plurality of second dielectric resonator antennas 1000*b* in a row, a width in parallel to the second direction DR2 of the antenna device 1001 may be formed to be narrow, and by this, the antenna device 1001 may be installed in a narrow region.

The first dielectric resonator antennas 1000*a* and the second dielectric resonator antennas 1000*b* may have the same structure as at least one of the dielectric resonator antennas 100, 200, 300, 100*a*, 200*a*, 200*b*, and 300*a* according to embodiments.

For example, the plurality of first dielectric resonator antennas 1000*a* may include: a first dielectric material block 110 and a second dielectric material block 120 that are stacked; a bonding layer 130 positioned between the first dielectric material block 110 and the second dielectric material block 120 and bonding the first dielectric material block 110 and the second dielectric material block 120; feed vias 11*a* and 12*a* positioned in the first dielectric material block 110; feed patterns 21*a* and 22*a* positioned between the first dielectric material block 110 and the second dielectric material block 120 and connected to the feed vias 11*a* and 12*a*; and an antenna patch 31*a* positioned between the first dielectric material block 110 and the second dielectric material block 120, spaced from the feed patterns 21*a* and 22*a*, and coupled to the same.

For example, the plurality of second dielectric resonator antennas 1000*b* may include: a first dielectric material block 110 and a second dielectric material block 120 that are stacked; a bonding layer 130 positioned between the first dielectric material block 110 and the second dielectric material block 120 and bonding the first dielectric material block 110 and the second dielectric material block 120; feed vias 11*b* and 12*b* positioned in the first dielectric material block 110; feed patterns 21*b* and 22*b* positioned between the first dielectric material block 110 and the second dielectric material block 120 and connected to the feed vias 11*b* and 12*b*; and an antenna patch 31*b* positioned between the first dielectric material block 110 and the second dielectric material block 120, spaced from the feed patterns 21*b*, and 22*b*, and coupled to the same.

The plurality of first dielectric resonator antennas 1000*a* may transmit and receive first RF signals, and the plurality of second dielectric resonator antennas 1000*b* may transmit and receive second RF signals. The first RF signal is a signal in a first frequency band, and the second RF signal is a signal in a second frequency band, and for example, the first frequency band may be about 24.25 GHz to about 29.5 GHz, and the center frequency of the first frequency band may be about 28 GHz. The second frequency band may be about 37 GHz to about 40 GHz, and the center frequency of the second frequency band may be about 39 GHz.

The dielectric resonator antenna devices 1000 and 1001 may be mounted on the electronic device, and as the size of a bezel of the electronic device reduces, the dielectric resonator antenna devices 1000 and 1001 may be mounted not on the front of the electronic device but on the lateral side of the bezel. As the electronic device becomes thinner, the lateral sides of the dielectric resonator antenna devices 1000 and 1001 become thin. As shown in FIG. 35 and FIG. 36, the length of the dielectric resonator antenna devices 1000 and 1001 in the first direction DR1 is greater than the length in the second direction DR2, and the second direction DR2 of the dielectric resonator antenna devices 1000 and 1001 is set to be the thickness direction of the bezel, so the dielectric resonator antenna devices 1000 and 1001 may be installed in the narrow region.

Figure 37:
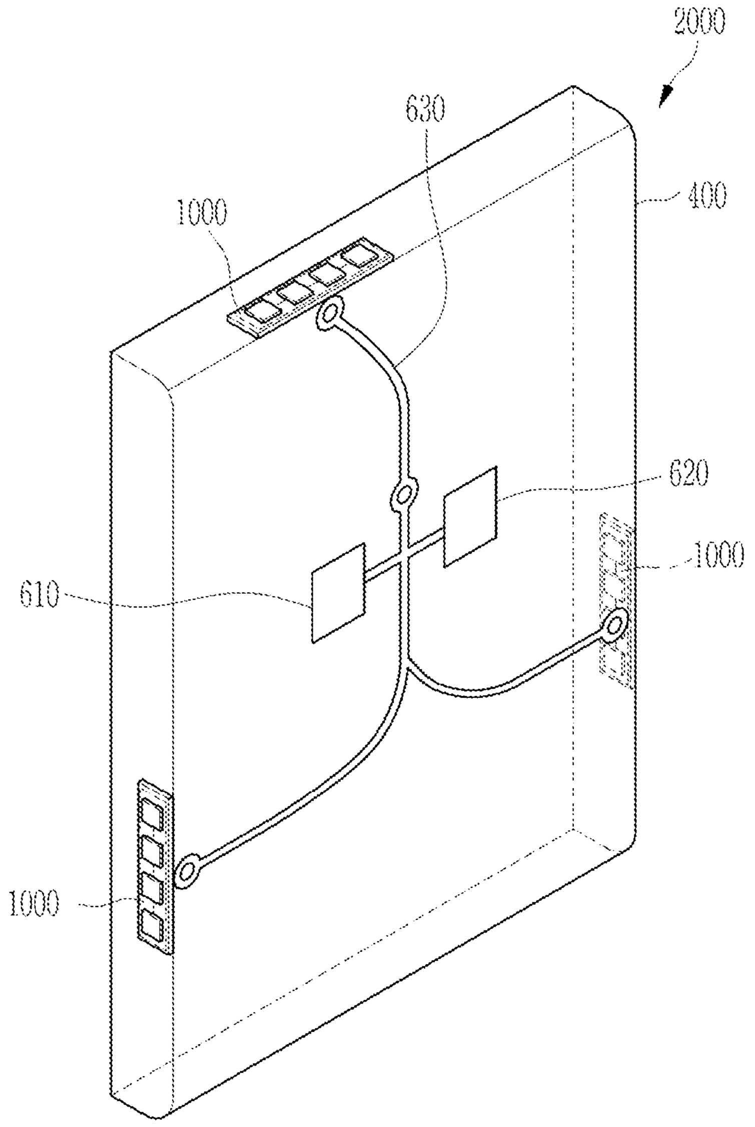
FIG. 37 shows an electronic device including a dielectric resonator antenna according to an embodiment.

An electronic device 2000 including a dielectric resonator antenna device according to an embodiment will now be described with reference to FIG. 37. FIG. 37 shows an electronic device including a dielectric resonator antenna according to an embodiment.

Referring to FIG. 37, the electronic device 2000 according to an embodiment includes a dielectric resonator antenna device 1000, and the dielectric resonator antenna device 1000 is disposed to a set 4000 of the electronic device 2000.

The electronic device 2000 may be a smart phone, a personal digital assistant, a digital video camera, a digital still camera, a network system, a computer, a monitor, a tablet, a laptop, a netbook, a television, a video game device, a smart watch, or an automotive device, but it is not limited thereto.

The electronic device 2000 may have a polygonal side, and the dielectric resonator antenna device 1000 may be disposed near at least a portion of a plurality of sides of the electronic device 2000.

A communication module 610 and a baseband circuit 620 may be further disposed on the set 4000. The antenna device may be connected to the communication module 610 and/or the baseband circuit 620 through a coaxial cable 630.

The communication module 610 may include at least some of a memory chip such as a volatile memory (e.g., a DRAM), a non-volatile memory (e.g., a ROM), or a flash memory; an application processor chip such as a central processor (e.g., a CPU), a graphics signal processor (e.g., a GPU), a digital signal processor, an encryption process, a microprocessor, or a microcontroller; and a logic chip such as an analog-digital converter or an application-specific IC (ASIC), so as to process digital signals.

The baseband circuit 620 may generate a base signal by performing analog-digital conversion, analog signal amplification, and filtering and frequency conversion. The base signal input and output by the baseband circuit 620 may be transmitted to the antenna device through a cable.

For example, the base signal may be transmitted to the IC through an electrical connection structure, a core via, and a wire. The IC may convert the base signal into a mmWave-band RF signal.

Figure 38:
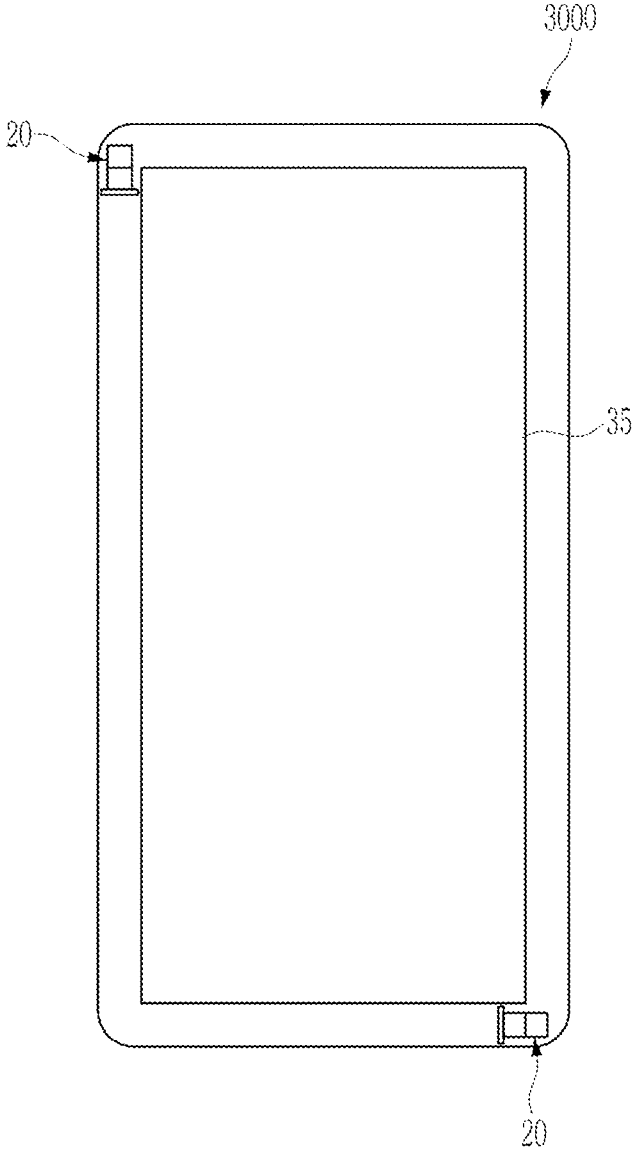
FIG. 38 shows an electronic device of a dielectric resonator antenna module according to embodiments.

An electronic device 3000 including a dielectric resonator antenna module will now be described with reference to FIG. 38. FIG. 38 shows an electronic device of a dielectric resonator antenna module according to embodiments.

Referring to FIG. 38, the electronic device 3000 according to an embodiment includes a dielectric resonator antenna module 20, and the dielectric resonator antenna module 20 may be disposed on a set substrate 35 of the electronic device 3000. The electronic device 3000 may have a polygon side, and the dielectric resonator antenna module 20 may be disposed near at least a portion of a plurality of sides of the electronic device 3000 and may be disposed in parallel to an adjacent side.

For example, the dielectric resonator antenna module 20 may be disposed in parallel to the sides of the front or the rear of the electronic device 3000 or may be disposed in parallel to the sides that are not of the front or the rear of the electronic device 3000. Further, the electronic device 3000 may include a plurality of dielectric resonator antenna modules 20, and some of the dielectric resonator antenna modules 20 may be disposed in parallel to the sides of the front or the rear of the electronic device 3000, and others of the dielectric resonator antenna modules 20 may be disposed in parallel to the sides of the lateral side of the electronic device 3000.

The antenna module 20 according to an embodiment may be one of the antenna modules 400, 400*a*, 500, 500*a*, 600, 600*a*, 700, 700*a*, 800, and 800*a* according to the above-described embodiments. The antenna modules 400, 400*a*, 500, 500*a*, 600, 600*a*, 700, 700*a*, 800, and 800*a* include: a first dielectric material block 110 and a second dielectric material block 120 stacked with the bonding layer 130 therebetween in one direction; a feed via positioned on the first dielectric material block 110; and a feed pattern and an antenna patch positioned between the first dielectric material block 110 and the second dielectric material block 120, so the dielectric resonator antenna modules 400, 400*a*, 500,

500*a*, 600, 600*a*, 700, 700*a*, 800, and 800*a* may have a long shape in the direction in which the first dielectric material block 110 and the second dielectric material block 120 are stacked. Therefore, it is easy to dispose them along the edge near the boundary of the electronic device 3000.

Figure 39A:
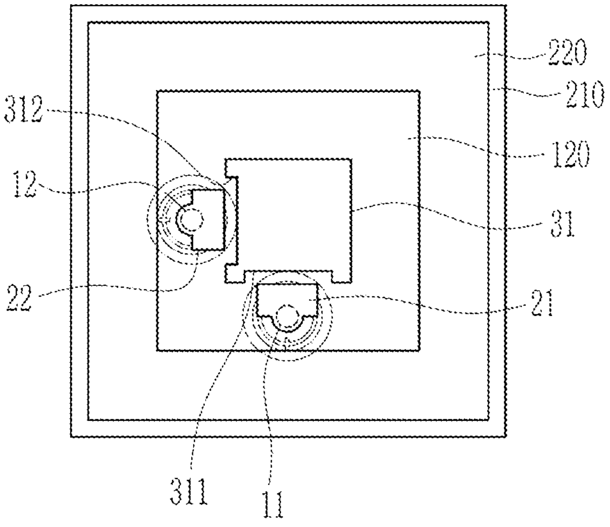
FIG. 39A, FIG. 39B, and FIG. 39C show top plan views of a dielectric resonator antenna device according to an experimental example.
Figure 39B:
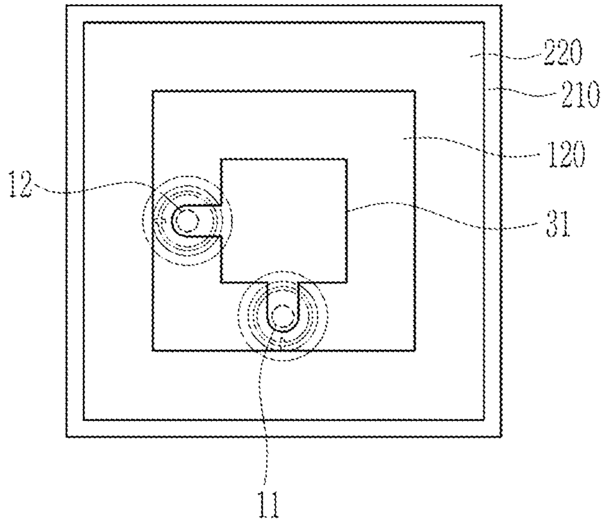
Figure 39C:
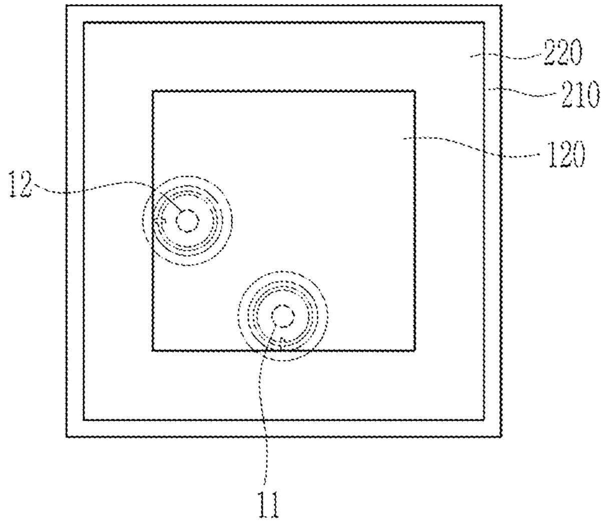
Figure 40A:
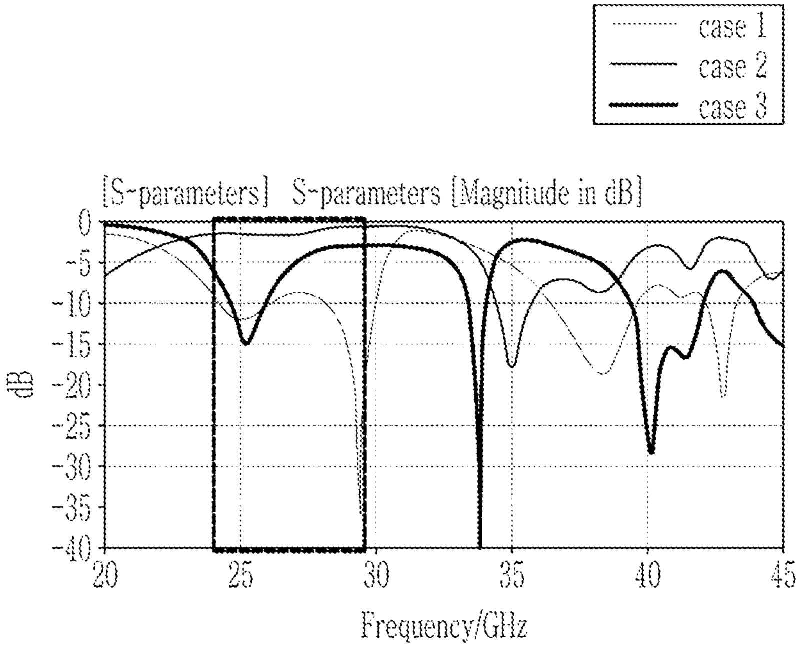
FIG. 40A and FIG. 40B show graphs of results of one experimental example.
Figure 40B:
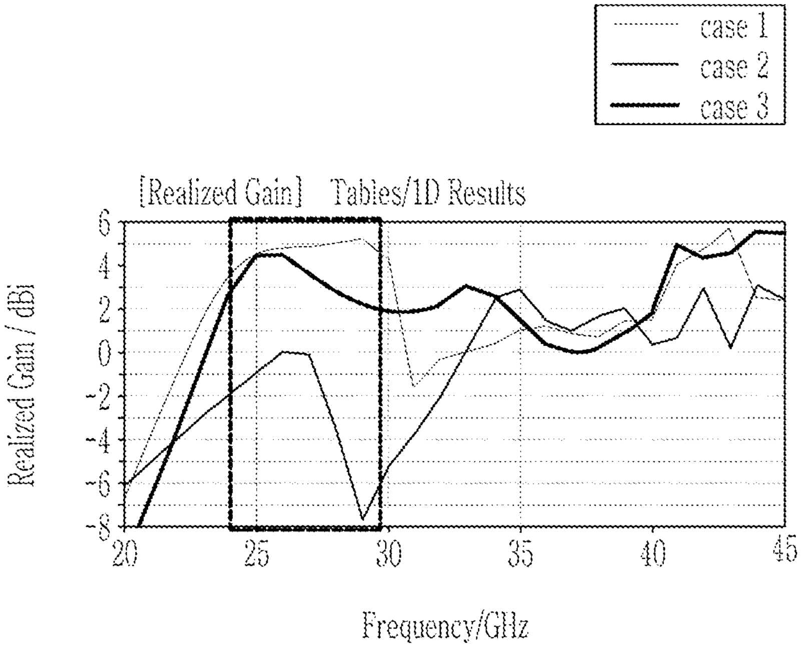

An experimental example will now be described with reference to FIG. 39A to FIG. 39C and FIG. 40A and FIG. 40B. FIG. 39A to FIG. 39C show top plan views of a dielectric resonator antenna device according to an experimental example, and FIG. 40A and FIG. 40B show graphs of results of one experimental example.

In the present experimental example, the dielectric resonator antenna is respectively formed according to a first case (case 1), a second case (case 2), and a third case (case 3), and reflection coefficients and gains of the antenna with respect to frequency are measured.

According to the first case (case 1), as shown in FIG. 39A, the dielectric resonator antenna includes: a first dielectric material block 110 and a second dielectric material block 120 bonded with a bonding layer 130 therebetween; a first feed via 11 and a second feed via 12 positioned on a first dielectric material block 110; a first feed pattern 21 and a second feed pattern 22 positioned between a first dielectric material block 110 and a second dielectric material block 120 and connected to the first feed via 11 and the second feed via 12; and an antenna patch 31 positioned between the first dielectric material block 110 and the second dielectric material block 120 and spaced from the first feed pattern 21 and the second feed pattern 22.

According to the second case (case 2), as shown in FIG. 39B, the dielectric resonator antenna includes: a first dielectric material block 110 and a second dielectric material block 120 bonded with a bonding layer 130 therebetween; a first feed via 11 and a second feed via 12 positioned on the first dielectric material block 110; and an antenna patch 31 positioned between the first dielectric material block 110 and the second dielectric material block 120 connected to the first feed via 11 and the second feed via 12.

According to the third case (case 3), as shown in FIG. 39C, the dielectric resonator antenna includes: a first dielectric material block 110 and a second dielectric material block 120 bonded with a bonding layer 130 therebetween; and a first feed via 11 and a second feed via 12 positioned on the first dielectric material block 110.

Regarding the first case (case 1), the second case (case 2), and the third case (case 3), the first dielectric material block 110, the second dielectric material block 120, and the bonding layer 130 have the same material, size, and thickness except for whether there is a feed pattern, and a shape of the antenna patch.

Regarding the first case (case 1), the second case (case 2), and the third case (case 3), results of reflection coefficients with respect to measured frequency are shown in FIG. 40A, and results of gains of the antenna are shown in FIG. 40B.

Referring to FIG. 40A, according to the first case (case 1) of forming a dielectric resonator antenna including a first feed pattern 21 and a second feed pattern 22 positioned between the first dielectric material block 110 and the second dielectric material block 120 and connected to the first feed via 11 and the second feed via 12, and an antenna patch 31 positioned between the first dielectric material block 110 and the second dielectric material block 120 and spaced from the first feed pattern 21 and the second feed pattern 22 in a like manner of the dielectric resonator antenna according to an embodiment, it is found that an absolute value of the reflection coefficient of about 24 GHz to about 29 GHz is relatively greater than absolute values of the reflection coefficients of the second case (case 2) and the third case (case 3), and particularly, it is found that the absolute value of the reflection coefficient in the range of about 29 GHz in which the frequency is relatively big is big. As described, it is found that the frequency bandwidth of the first case (case 1) of forming the dielectric resonator antenna is wider than the frequency bandwidths of the second case (case 2) and the third case (case 3) in a like manner of the case resonator antenna according to the present embodiment.

Referring to FIG. 40B, according to the first case (case 1) of forming a dielectric resonator antenna including a first feed pattern 21 and second feed pattern 22 positioned between the first dielectric material block 110 and the second dielectric material block 120 and connected to the first feed via 11 and the second feed via 12, and an antenna patch 31 positioned between the first dielectric material block 110 and the second dielectric material block 120 and spaced from the first feed pattern 21 and the second feed pattern 22 in a like manner of the dielectric resonator antenna according to an embodiment, it is found that a gain of the antenna at about 24 GHz to about 29 GHz is greater than the antenna gains of the second case (case 2) and the third case (case 3).

As described, according to the dielectric resonator antenna according to an embodiment, it is found that the bandwidth of the antenna is widened, and the gain of the antenna is increased.

Figure 41:
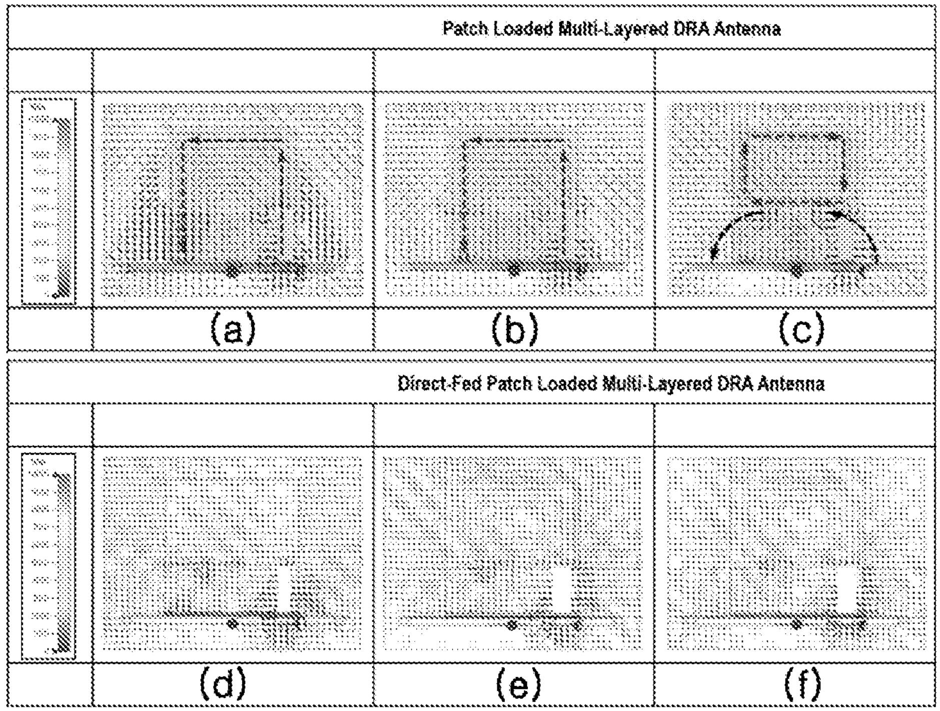
FIG. 41 shows a graph of results of one experimental example.

Another experimental example will now be described with reference to FIG. 41. FIG. 41 shows a graph of results of another experimental example.

In the present experimental example, a distribution of electric fields is measured, and results are shown in FIG. 41, regarding the first case (case 1) shown in FIG. 39A and the second case (case 2) shown in FIG. 39B. Referring to FIG. 41, (a), (b), and (c) show the distribution of electric fields when the frequency is about 25 GHz, 27 GHz, and 29 GHz regarding the antenna in the first case (case 1), and (d), (e), and (f) show the distribution of electric fields when the frequency is about 25 GHz, 27 GHz, and 29 GHz regarding the antenna in the second case (case 2).

Referring to FIG. 41, as shown in the dielectric resonator antenna, it is found that resonance is generated along the edge of the antenna in the first case (case 1) at about 25 GHz and about 27 GHz, and it is also found that the resonance is well generated up to an upper portion in which second dielectric material block 120 is positioned in addition to a lower portion in which the first dielectric material block 110 is positioned. Further, it is found that the resonance is generated along the edge of the antenna on a portion in which the second dielectric material block 120 is positioned at about 29 GHz, and it is found that the resonance by the antenna patch 31 is generated at the portion in which the first dielectric material block 110 is positioned.

On the contrary, regarding the antenna according to the second case (case 2), antenna resonance is not easily generated at about 25 GHz, 27 GHz, and 29 GHz, and particularly, it is found that the upper portion in which the second dielectric material block 120 is positioned has very low electric field intensity.

As described, when the antenna patch 31 covers the feed vias 11 and 12 like the case of the second case (case 2), it is found that the electric signal is not well transmitted and received up to the second dielectric material block 120 positioned on the antenna patch 31.

According to the embodiments, the antenna for improving the gain and the bandwidth, and the antenna module, may be provided.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A dielectric resonator antenna comprising:

a first dielectric material block;

a second dielectric material block stacked in a first direction on the first dielectric material block;

a bonding layer disposed between the first dielectric material block and the second dielectric material block, and combined to the first dielectric material block and the second dielectric material block;

a feeder disposed in the first dielectric material block;

a feed pattern disposed between the first dielectric material block and the second dielectric material block and connected to the feeder; and an antenna patch disposed between the first dielectric material block and the second dielectric material block and spaced from the feed pattern, wherein the second dielectric material block is configured to generate resonance with a predetermined frequency, wherein a dielectric constant of the first dielectric material block is less than a dielectric constant of the second dielectric material block, wherein a thickness of the first dielectric material block is less than a thickness of the second dielectric material block, and wherein the first dielectric material block has a same planar area as the second dielectric material block along the first direction.

2. The dielectric resonator antenna of claim 1, wherein the feed pattern and the antenna patch are disposed between the first dielectric material block and the bonding layer.

3. The dielectric resonator antenna of claim 2, wherein the feed pattern and the antenna patch are disposed on a same layer.

4. The dielectric resonator antenna of claim 2, wherein:

the feed pattern is disposed between the first dielectric material block and the bonding layer, and the antenna patch is disposed between the bonding layer and the second dielectric material block.

5. The dielectric resonator antenna of claim 4, wherein the feed pattern includes a portion not overlapping the antenna patch in the first direction.

6. The dielectric resonator antenna of claim 1, wherein the feeder is a feed strip disposed outside the first dielectric material block.

7. The dielectric resonator antenna of claim 1, wherein the first dielectric material block includes a plurality of dielectric layers.

8. The dielectric resonator antenna of claim 1, wherein:

the feeder includes a first feeder and a second feeder spaced from each other, the feed pattern includes a first feed pattern connected to the first feeder and a second feed pattern connected to the second feeder, and the antenna patch is spaced from at least one of the first feed pattern and the second feed pattern.

9. An electronic device comprising:

the dielectric resonator antenna of claim 1; and one or more of a communication module and a baseband circuit, wherein the dielectric resonator antenna device is disposed near a side of the electronic device, and is connected to at least one of the one or more of a communication module and a baseband circuit.

10. A dielectric resonator antenna module comprising:

a substrate;

a feed wire disposed on the substrate and a ground electrode disposed on the substrate and insulated from the feed wire;

a first dielectric material block disposed on the substrate and connected to the ground electrode;

a second dielectric material block stacked on the first dielectric material block in a first direction;

a bonding layer disposed between the first dielectric material block and the second dielectric material block and combined to the first dielectric material block and the second dielectric material block;

a feeder disposed in the first dielectric material block and connected to the feed wire;

a feed pattern disposed between the first dielectric material block and the second dielectric material block and connected to the feeder; and an antenna patch disposed between the first dielectric material block and the second dielectric material block and spaced from the feed pattern, wherein the second dielectric material block is configured to generate resonance with a predetermined frequency, wherein a dielectric constant of the first dielectric material block is less than a dielectric constant of the second dielectric material block, wherein a thickness of the first dielectric material block is less than a thickness of the second dielectric material block, and wherein the first dielectric material block has a same planar area as the second dielectric material block along the first direction.

11. The dielectric resonator antenna module of claim 10, further comprising:

a first contact pad disposed between the feed wire and the feeder; and a plurality of second contact pads disposed between the first dielectric material block and the ground electrode, wherein a thickness of the first contact pad and a thickness of the second contact pads are substantially the same as each other, and the first contact pad and the second contact pads are disposed at regular intervals along an edge of the first dielectric material block.

12. The dielectric resonator antenna module of claim 10, wherein:

the feed pattern and the antenna patch are disposed between the first dielectric material block and the bonding layer, and the feed pattern and the antenna patch are disposed on a same layer.

13. The dielectric resonator antenna module of claim 10, wherein:

the feed pattern is disposed between the first dielectric material block and the bonding layer, the antenna patch is disposed between the bonding layer and the second dielectric material block, and the feed pattern includes a portion not overlapping the antenna patch in the first direction.

14. The dielectric resonator antenna module of claim 10, wherein the feeder is a feed strip disposed outside the first dielectric material block.

15. The dielectric resonator antenna module of claim 10, wherein:

the feeder includes a first feeder and a second feeder spaced from each other, the feed pattern includes a first feed pattern connected to the first feeder and a second feed pattern connected to the second feeder, and the antenna patch is spaced from at least one of the first feed pattern and the second feed pattern.

16. The dielectric resonator antenna module of claim 10, wherein the first dielectric material block includes a plurality of first dielectric material layers of the substrate.

17. The dielectric resonator antenna module of claim 16, wherein the second dielectric material block includes a plurality of second dielectric material layers of the substrate.

18. An electronic device comprising:

the dielectric resonator antenna module of claim 10; and one or more of a communication module and a baseband circuit, wherein the dielectric resonator antenna module is disposed near a side of the electronic device, and is connected to at least one of the one or more of a communication module and a baseband circuit.

19. A dielectric resonator antenna comprising:

a first dielectric material block;

a feed pattern and an antenna patch disposed spaced apart from each other on the first dielectric material block;

a second dielectric material block disposed on the feed pattern and the antenna patch; and a feeder traversing the first dielectric material block and connected to the feed pattern, wherein the second dielectric material block is configured to generate resonance with a predetermined frequency, wherein a dielectric constant of the first dielectric material block is less than a dielectric constant of the second dielectric material block, wherein a thickness of the first dielectric material block is less than a thickness of the second dielectric material block, and wherein the first dielectric material block has a same planar area as the second dielectric material block along a height direction.

20. The dielectric resonator antenna of claim 19, further comprising a bonding layer disposed between the first dielectric material block and the second dielectric material block, and combined to the first dielectric material block and the second dielectric material block.

21. The dielectric resonator antenna of claim 20, wherein:

the antenna patch is disposed between the first dielectric material block and the bonding layer or between the bonding layer and the second dielectric material block, and the feed pattern is disposed between the first dielectric material block and the bonding layer.

22. The dielectric resonator antenna of claim 19, wherein the feed pattern is exposed to the second dielectric material block by the antenna patch.

23. The dielectric resonator antenna of claim 19, wherein the feeder comprises one or more of a feed strip disposed outside the first dielectric material block and a feed via disposed in the first dielectric material block.

24. An electronic device comprising the dielectric resonator antenna of claim 19.

* * * * *